US012636601B2

(12) United States Patent (10) Patent No.: US 12,636,601 B2

Gale et al. (45) Date of Patent: May 26, 2026

(54) COMPACT ROOM AIR PURIFIER WITH INTEGRATED GASKETS

(71) Applicant: 3M INNOVATIVE PROPERTIES COMPANY, St. Paul, MN (US)

(72) Inventors: Brian D. Gale, Blaine, MN (US); Alonso M. Hernandez, Minneapolis, MN (US); Andrew R. Fox, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 545 days.

(21) Appl. No.: 18/130,128

(22) Filed: Apr. 3, 2023

(65) Prior Publication Data

US 2023/0330579 A1     Oct. 19, 2023

Related U.S. Application Data

(60) Provisional application No. 63/331,024, filed on Apr. 14, 2022.

(51) Int. Cl.
B01D 46/00          (2022.01)
B01D 46/24          (2006.01)
(Continued)

(52) U.S. Cl.
CPC ..... B01D 46/0005 (2013.01); B01D 46/0015 (2013.01); B01D 46/0049 (2013.01);
(Continued)

(58) Field of Classification Search
CPC ............ B01D 46/0005; B01D 46/2403; B01D 46/0002; B01D 2271/02; B01D 2265/06; F24F 8/108; F24F 13/28
(Continued)

(56) References Cited

U.S. PATENT DOCUMENTS

| 4,588,537 A | 5/1986 | Klaase et al. |
| 4,798,850 A | 1/1989 | Brown |

(Continued)

FOREIGN PATENT DOCUMENTS

| CN | 212657852 U | 3/2021 |
| EP | 1444024 B1 | 6/2011 |
| WO | 2021176291 A1 | 9/2021 |

OTHER PUBLICATIONS

"Blue Pure 411 Particle + Carbon Filter", BlueAir, [retrieved on Dec. 10, 2021], URL: <https://www.blueair.com/us/air-purifier-filters/blue-pure-411-particle-carbon/1851.html>, 2021, pp. 1-12.
(Continued)

*Primary Examiner* — Jennifer Dieterle
*Assistant Examiner* — Rachel Marie Slaugovsky
(74) *Attorney, Agent, or Firm* — Kenneth B. Wood

(57) ABSTRACT

A room air purifier including upper and lower portions with the lower portion including a detachable floor panel. The upper portion and the floor panel may respectively include integrated resilient upper and lower gaskets configured so that with an air filter removably installed in the room air purifier and with the floor panel attached to a lower housing piece of the lower portion of the room air purifier, the upper portion of the room air purifier, and the floor panel, apply pressure to the air filter through the upper and lower gaskets.

16 Claims, 8 Drawing Sheets

(51) Int. Cl.

| | |
|---|---|
| *B01D 46/42* | (2006.01) |
| *B01D 46/52* | (2006.01) |
| *B01D 46/88* | (2022.01) |
| *F24F 8/108* | (2021.01) |
| *F24F 13/28* | (2006.01) |

(52) U.S. Cl.
CPC ..... *B01D 46/2403* (2013.01); *B01D 46/4227* (2013.01); *B01D 46/523* (2013.01); *B01D 46/88* (2022.01); *F24F 13/28* (2013.01); *B01D 46/0016* (2013.01); *B01D 2271/027* (2013.01); *B01D 2273/30* (2013.01); *B01D 2275/203* (2013.01); *B01D 2279/50* (2013.01); *F24F 8/108* (2021.01)

(58) Field of Classification Search
USPC .................................................. 55/492–498
See application file for complete search history.

(56) References Cited

U.S. PATENT DOCUMENTS

| | | | |
|---|---|---|---|
| 5,207,812 A | 5/1993 | Tronto et al. | |
| 5,496,507 A | 3/1996 | Angadjivand et al. | |
| 6,457,750 B1 | 10/2002 | Sokurenko et al. | |
| 7,628,837 B2 | 12/2009 | Ehrenberg | |
| 7,947,142 B2 | 5/2011 | Fox et al. | |
| 8,186,728 B2 | 5/2012 | Kopylov | |
| 8,973,761 B2 | 3/2015 | Bansal et al. | |
| 9,919,252 B2 | 3/2018 | Wennerström et al. | |
| 10,780,416 B2 | 9/2020 | Wendland et al. | |
| 2003/0168400 A1 | 9/2003 | Ham | |
| 2006/0005518 A1 | 1/2006 | Duffy et al. | |
| 2012/0160755 A1 | 6/2012 | Lacroix et al. | |
| 2018/0021716 A1 | 1/2018 | Li et al. | |
| 2019/0331137 A1* | 10/2019 | Xiao | F04D 29/325 |
| 2020/0087958 A1 | 3/2020 | Siiskonen | |
| 2025/0003612 A1* | 1/2025 | Gray | F24F 8/108 |

OTHER PUBLICATIONS

"Blue Pure 411", BlueAir, [retrieved on Dec. 10, 2021], URL: <https://www.blueair.com/us/blue/pure-411/1693.html>, 2021, pp. 1-16.

* cited by examiner

COMPACT ROOM AIR PURIFIER WITH INTEGRATED GASKETS

CROSS REFERENCE TO RELATED APPLICATIONS

This application claims priority from U.S. Provisional Application Ser. No. 63/331,024, filed 14 Apr. 2022, the disclosure of which is incorporated by reference in its/their entirety herein.

BACKGROUND

Room air purifiers are often used to purify (e.g., to remove at least some fine particles from) ambient air e.g. in rooms of houses, condominiums, apartments, offices, and so on.

SUMMARY

In broad summary, herein is disclosed a room air purifier comprising upper and lower portions with the lower portion comprising a detachable floor panel. In some aspects, the upper portion and the floor panel may respectively comprise integrated resilient upper and lower gaskets configured so that with an air filter removably installed in the room air purifier and with the floor panel attached to a lower housing piece of the lower portion of the room air purifier, the upper portion of the room air purifier, and the floor panel, apply pressure to the air filter through the upper and lower gaskets. These and many other aspects will be apparent from the detailed description below. In no event, however, should this broad summary be construed to limit the claimable subject matter, whether such subject matter is presented in claims in the application as initially filed or in claims that are amended or otherwise presented in prosecution.

Like reference numbers in the various figures indicate like elements. Some elements may be present in identical or equivalent multiples; in such cases only one or more representative elements may be designated by a reference number but it will be understood that such reference numbers apply to all such identical elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated.

Although terms such as "first" and "second" may be used in this disclosure, it should be understood that those terms are used in their relative sense only unless otherwise noted. As used herein as a modifier to a property or attribute, the term "generally", unless otherwise specifically defined, means that the property or attribute would be readily recognizable by a person of ordinary skill but without requiring absolute precision or a perfect match. The term "substantially", unless otherwise specifically defined, means to a high degree of approximation but again without requiring absolute precision or a perfect match. Terms such as "upper", "lower", "vertical", and related terms, are used with respect to a room air purifier that is positioned standing upright on a generally horizontal surface (e.g. a floor, tabletop or countertop) for ordinary operation of the room air purifier. All such terms are used for clarity of description; it will be appreciated that a room air purifier and portions and components thereof may occasionally be in other orientations (e.g. the room air purifier may be inverted in order to remove a floor panel in order to replace an air filter of the room air purifier).

DETAILED DESCRIPTION

Figure 1:
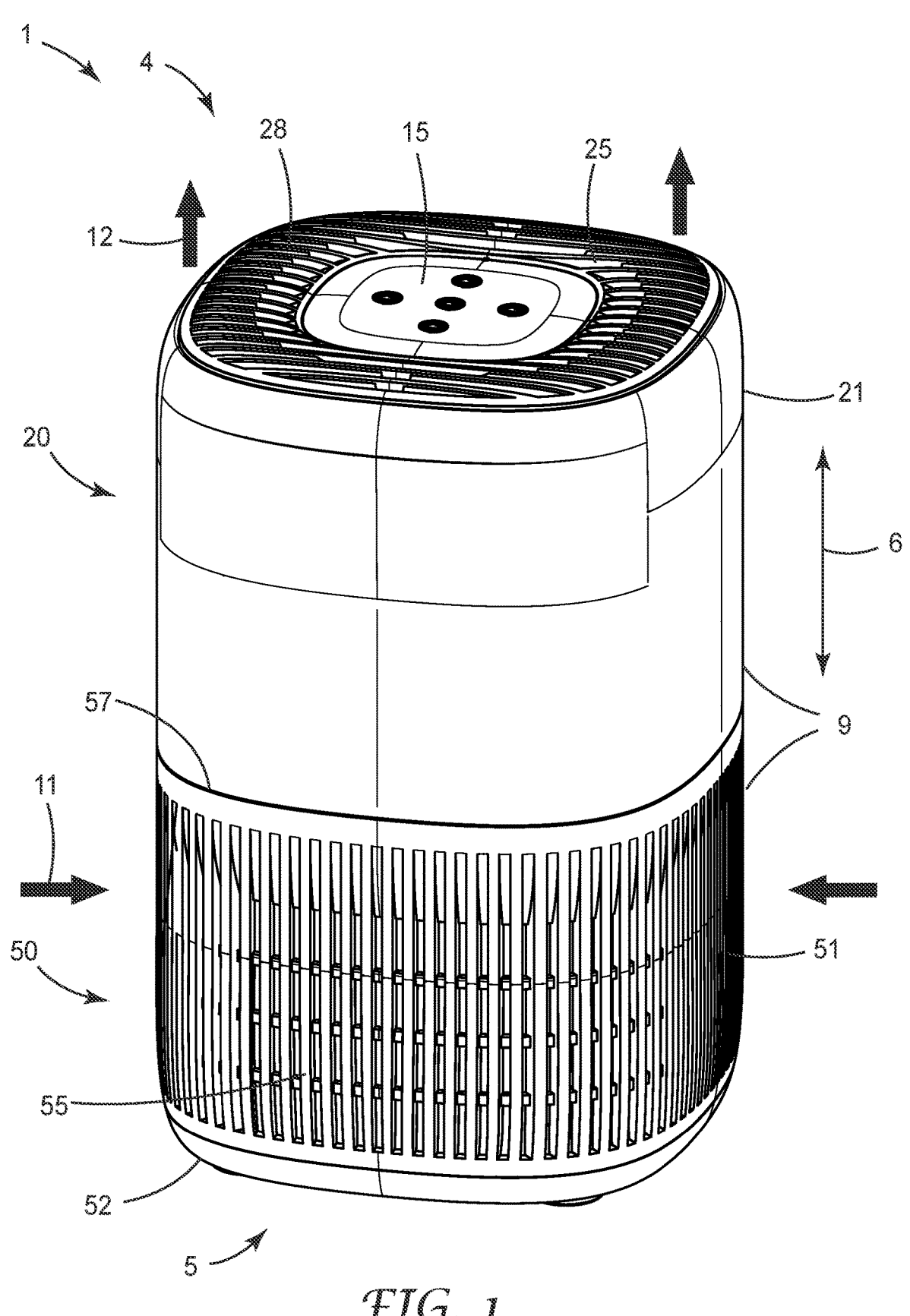
FIG. 1 is a perspective view of an exemplary room air purifier as disclosed herein.

Shown in FIG. 1 in perspective view is an exemplary powered room air purifier 1. A room air purifier is an electrically powered apparatus (often portable) that can be placed within a room and can be operated to pull room air into the purifier, to filter the air (e.g. to remove at least particles, and potentially other materials, therefrom) through an air filter that is removably installed in the purifier, and to return the air to the room. As such, a room air purifier is distinguished from e.g. an HVAC system that performs heating and/or cooling of the air, from apparatus that filter liquids such as water, and so on. While some amount of particles may be captured on an air filter of a room air purifier, a room air purifier is not configured to capture and accumulate large quantities of debris in a designated receptacle. As such, a room air purifier is distinguished from vacuum cleaners, e.g. from cylindrical vacuum cleaners such as the well-known wet-or-dry vacuum cleaners available under the trade designation SHOP-VAC.

Figure 2:
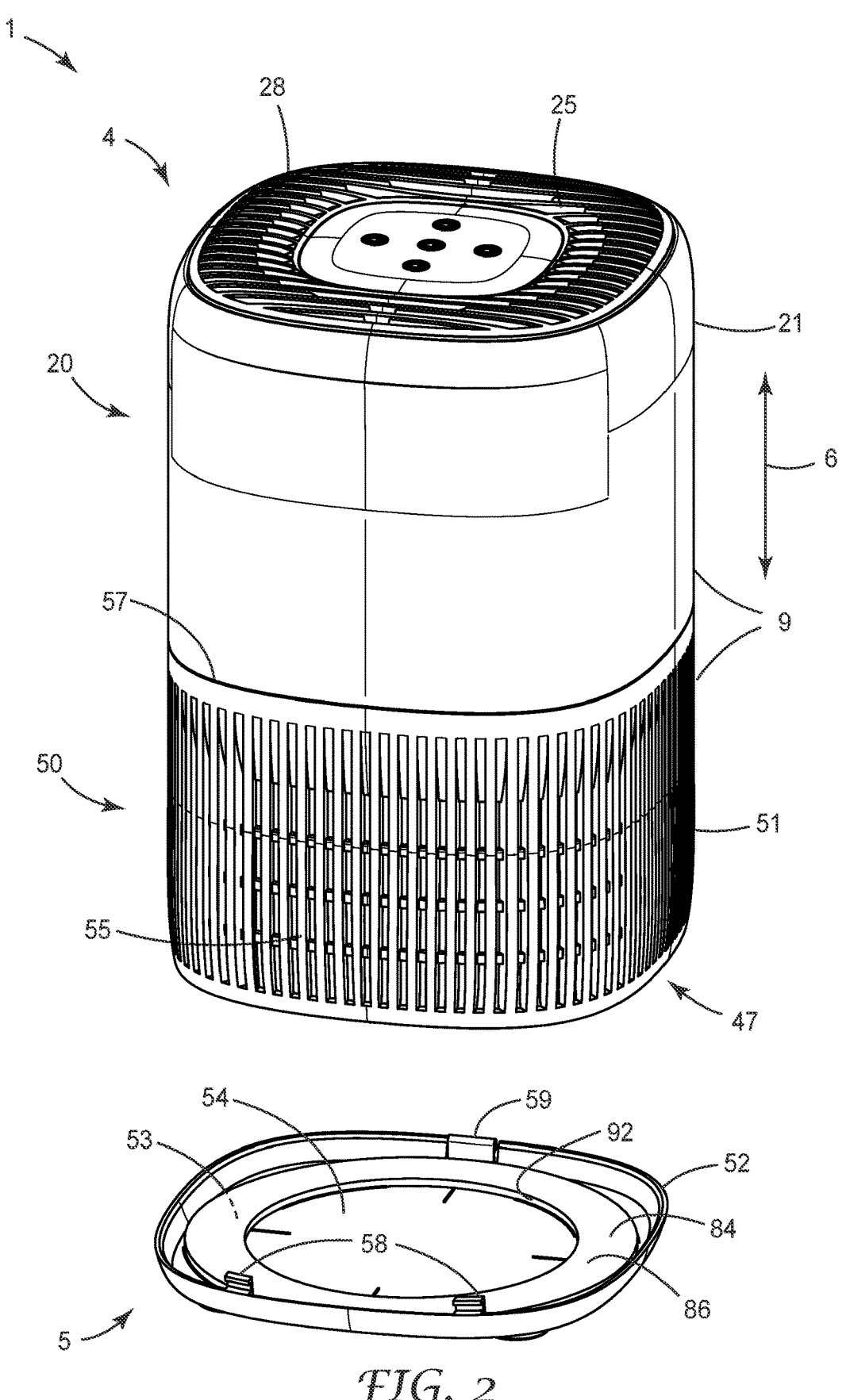
FIG. 2 is a perspective view of an exemplary room air purifier with a lowermost floor panel shown exploded away from the rest of the room air purifier.

Room air purifier 1 includes a housing 9 defining at least one air inlet 55, at least one filtered-air outlet 25, and an airflow path therebetween. Room air purifier 1, when positioned for ordinary operation (e.g. upright on a floor or tabletop) will exhibit an upper end 4 and a lower end 5. Lower end 5 may have a generally flat bottom and/or multiple (e.g. three or four) bosses with coplanar bottom surfaces for stable positioning of the room air purifier on a horizontal surface (in some instances, lower end 5 may have wheels). Such a room air purifier will often exhibit a longitudinal axis that, when the room air purifier is positioned for ordinary operation, will at least generally coincide with a vertical axis as defined by Earth's gravity. The longitudinal/vertical axis for exemplary room air purifier 1 is identified as arrow 6 in various Figures. All such directional terms are used for clarity of description and have no limiting meaning with regard to how any particular room air purifier may be occasionally positioned or oriented for actual use in a room, for carrying between rooms, and so on. The exemplary room air purifier 1 as depicted in FIG. 1 is comprised of upper and lower portions 20 and 50, as shown in FIG. 2. Portions 20 and 50 collectively form room air purifier 1, and are inseparable (that is, are not detachable) from each other. Lower portion 50 comprises a lowermost floor panel 52 (shown exploded away from the rest of the room air purifier in FIG. 2) that can be detached from the remainder of lower portion 50 in order to change (or install) an air filter in the room air purifier.

Upper and lower portions 20 and 50 respectively comprise upper and lower housing pieces 21 and 51 (made e.g. of molded plastic) that collectively provide the majority of overall housing 9 of the room air purifier (other housing pieces and various items and components may provide small portions of housing 9). The lower end of upper housing piece 21 and the upper end of lower housing piece 51 may meet at a junction 57 as indicated in FIG. 1. In the depicted embodiment, upper portion 20 also comprises a waistpiece 24 as visible in FIG. 3; waistpiece 24 is non-detachably attached to upper portion 20 (e.g. to one or more major components thereof, e.g. a fan shroud as described later herein). In some embodiments, an upper section of lower housing piece 51 and a lower section of upper housing piece 21 may overlap each other in a radially inward-outward direction, e.g. so that the upper section of lower housing piece 51 overlaps the above-described waistpiece, as is evident from comparison of FIGS. 2 and 3. This overlapping may enhance the stability and mechanical robustness of the assembled room air purifier.

Room air purifier 1 will comprise an airflow path therethrough. In the exemplary depiction of FIGS. 1 and 2, ambient air will enter air inlet 55 as indicated by arrows 11, will pass into an unfiltered-air space 56, and from there will pass through an air filter 100 that is disposed on a mandrel 60. After passing through air filter 100 and mandrel 60, the air (now having been filtered) will enter a filtered airspace 65 within mandrel 60. From there the filtered air will pass upwards into an upper filtered-air space 89 within upper portion 20 of the room air purifier, with the filtered air exiting through air outlet 25 as indicated by arrows 12. Air inlet 55 and outlet 25 may be at any suitable location and in any suitable number; the terms inlet and outlet are used broadly, and encompass arrangements ranging from e.g. a single large orifice to a large number of individual apertures (the latter arrangement is depicted in the figures herein). In some embodiments, air outlet 25 may be located at or toward the upper end 4 of the room air purifier so that filtered air will be emitted generally upward and/or somewhat radially outward from the room air purifier; in some embodiments outlet 25 may be defined by a grill (e.g. a molded grill 28 as seen in FIG. 1).

Air inlet 55 may be at any suitable location of lower portion 50 of the room air purifier. In the depicted embodiment of FIG. 2, air inlet 55 (which in this instance is provided by a large number of individual apertures) extends around substantially the entire circumferential extent of lower housing piece 51. However, any arrangement is possible as long as sufficient airflow is enabled; thus in some embodiments, a room air purifier may comprise "front" side and a "rear" side e.g. with no air inlet being present on the "rear" side. In some embodiments the lower portion 50 of the room air purifier may include a mesh or screen that is configured e.g. to prevent gross debris such as pet hair and the like from entering air inlet 55. Such a screen may be e.g. abutted against the radially-inward surfaces of lower housing piece 51 so as to cover the air-transmissive apertures of air inlet 55. In various embodiments, such a screen may be washable, removable, and so on. Any such screen that merely serves as a guard against gross debris will be considered to be a separate item from the later-described air filter 100.

Figure 3:
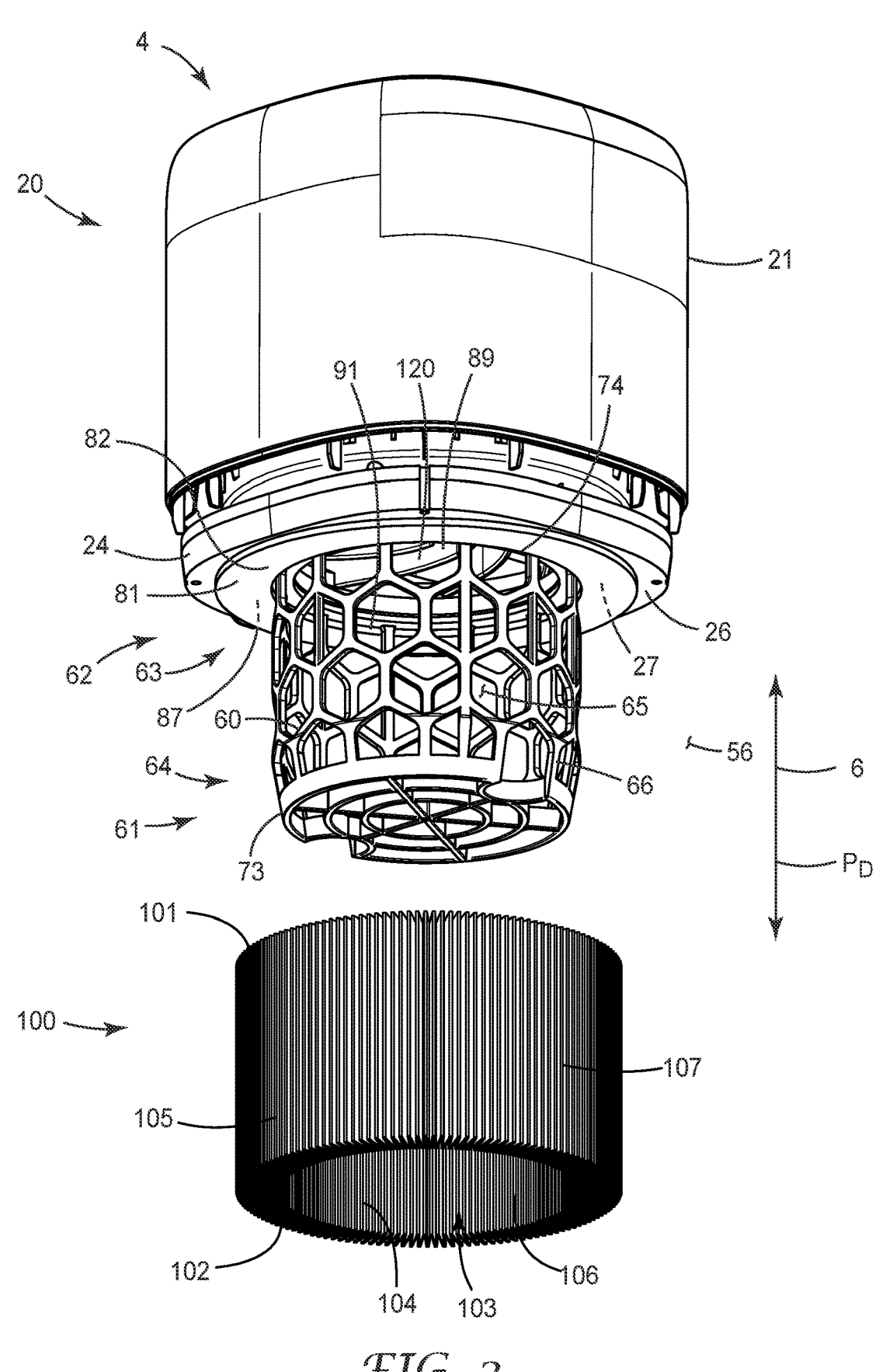
FIG. 3 is a perspective view of various components of an exemplary room air purifier, with a pleated air filter shown exploded away from the other components and with a lower housing piece and floor panel omitted.

Upper portion 20 of room air purifier 1 will comprise, among other items, an upper housing piece 21 and a powered fan 120 as noted. In many embodiments, upper portion may comprise a partial partition 87, which is most easily seen in FIG. 3. As can be seen in FIG. 3, which is a view of the room air purifier with the lower housing piece 51 omitted and with the air filter 100 exploded downward away from other components of the room air purifier, in embodiments such a partition 87 may be provided by a portion of a floor 26 of waistpiece 24. Partition 87 serves to separate an upper, filtered-air space 89 from a lower space 56 containing air that has not yet been filtered (lower, unfiltered-air space 56 will radially-outwardly surround mandrel 60 and an air filter 100 mounted thereon, as discussed elsewhere herein). In some embodiments, a section of the lower surface of floor 26 (e.g. of partition 87) may provide an annular seating surface 27 for an upper resilient gasket 81, as indicated in FIG. 3 and as discussed in detail later herein. Partition 87 and/or floor 26 defines an orifice (visible in FIG. 3) that will allow filtered air within interior air space 65 of mandrel 60 to pass upwardly into upper filtered-air space 89. In some embodiments this orifice may be covered by an air-transmissive protective screen (not shown in the Figures) to ensure that a user will not inadvertently reach into space 89 within which fan 120 is located.

In order to minimize the likelihood of an unacceptably large amount of unfiltered air being able to enter filtered-air space 89, in some embodiments partition 87 may comprise few or no pathways that might allow a significant amount of unfiltered air may pass therethrough. In other words, in some embodiments partition 87 may comprise few or no through-holes unless each such through-hole is occupied by an object (e.g. a screw or other suitable fastener) that at least substantially occludes the through-hole. Similarly, upper housing piece 21 of upper portion 20 may be substantially free of any unoccluded openings that might allow unfiltered air to enter filtered-air space 89 (and/or, partitions may be provided within upper portion 20 to so that filtered-air space 89 is isolated from other spaces within upper portion 20).

Room air purifier 1 includes at least one fan 120, of which portions are visible in various Figures. Fan 120 motivates ambient air to enter the room air purifier and pass through the air filter 100 installed therein and to exit the room air purifier as filtered air. In many convenient embodiments, such a fan 120 may be an axial fan or a mixed-flow fan that is positioned within the upper portion 20 of the room air purifier. By definition, room air purifier 1 is a powered room air purifier, meaning that fan 120 is driven by electric power, possibly from an internal power source (e.g. battery) but more typically delivered through a cord from an external power source. No cord is shown in the Figs. herein but such a cord may enter the upper portion 20 of the room air purifier via a suitable port; in some embodiments the lower portion 50 of the room air purifier may comprise a cord guide to facilitate the positioning of the cord.

In some embodiments, fan 120 will be located generally within a fan shroud 122, portions of which are visible in various Figures. The shroud may serve to direct the air that is motivated by the fan, and may further serve to subdivide upper portion 20 of the room air purifier into a space 89 that contains filtered, moving air, and one or more auxiliary chambers that are typically quiescent (that is, containing air that is largely unmoving, rather than forming part of an airflow pathway).

In many embodiments, the upper portion 20 of the room air purifier will comprise not only the powered fan 120, but also any control circuitry, switches, visual indicators, and so on, as are needed to operate the room air purifier. In many such embodiments the lower portion 50 of the room air purifier will not have any components that require electric power, thus in such embodiments there is no reason to equip lower portion 50 with an electrical cord or to provide any kind of electrical connection between upper portion 20 and lower portion 50.

Control circuitry of the room air purifier may be of any suitable type and may include any appropriate components. The control circuitry will be in operative connection with fan 120 (e.g. so that the fan can be turned on and off and operated at different speeds if desired) and is also in operative connection with various controls and switches, monitors, displays and/or indicators, etc., that allow a user to directly operate room air purifier 1. The control circuitry may be operatively accessible e.g. by way of a control panel 15 located e.g. on the top of upper housing piece 21 as indicated in FIG. 1. (In some embodiments, a filtered-air outlet 25 of the room air purifier may at least partially annularly surround a generally radially centrally located control panel 15 in the general manner shown in FIG. 1.) In some embodiments, the control circuitry may include a wireless communication unit that allows the control circuitry to communicate with an external device. Such arrangements can allow the room air purifier to be operated (and/or its operating status monitored) remotely; this may be in addition to, or rather than, being operated directly by way of controls located on the room air purifier itself.

As discussed in further detail later herein, room air purifier 1 may be configured so that the room air purifier may be inverted in order to facilitate removal and replacement of an air filter. To allow the room air purifier to be placed on a horizontal while inverted, the upper end of the upper portion of the room air purifier may comprise an item (e.g. a grill 28 that defines air outlet 25) that extends upward beyond control panel 15. In some embodiments, grill 28 may comprise an upwardly-convex shape as shown in the cross-sectional view of FIG. 5, to facilitate this. Such arrangements can provide that when the room air purifier is placed on a horizontal surface (e.g. a table or counter) while inverted, the room air purifier will rest on grill 28 so that elements of control panel 15 do not contact the horizontal surface.

It is noted that all positional and orientational descriptions herein (e.g. upper, lower, etc.) are applied with the room air purifier 1 in its upright position for ordinary operation (as in FIGS. 1-3), notwithstanding that the room air purifier can be temporarily inverted (e.g. to an orientation as in FIG. 4) in order to install or replace an air filter.

Room air purifier 1 will comprise a mandrel 60 as visible in various Figures herein. Mandrel 60 is generally cylindrical in shape and is configured with a radially outward surface 66 to receive and support an air filter 100. Mandrel 60 as shown e.g. in FIG. 3 comprises an upper portion 63 that makes up a majority of the area of the mandrel (e.g. that occupies up at least 70, 80, 90, or 95% of the vertical height of the mandrel) and that is discontinuous so as to be highly air-transmissive. In many convenient embodiments, portion 63 may take the general form of a "lattice" that is air-transmissive by way of comprising solid members (e.g. bar, struts, beams or the like) 67 that are interspersed with through-openings 68. However, any suitable arrangement may be used (in particular, the air-transmissive through-openings 68 may be of any suitable size and shape). For example, portion 63 may take the form of a screen, as long as the screen comprises sufficient mechanical strength and stability. In various embodiments, upper portion 63 of mandrel 60 will comprise through-openings of sufficient size and/or density so that upper portion 63 exhibits a percent open area of at least 60, 70, 80, or 90.

Figure 7:
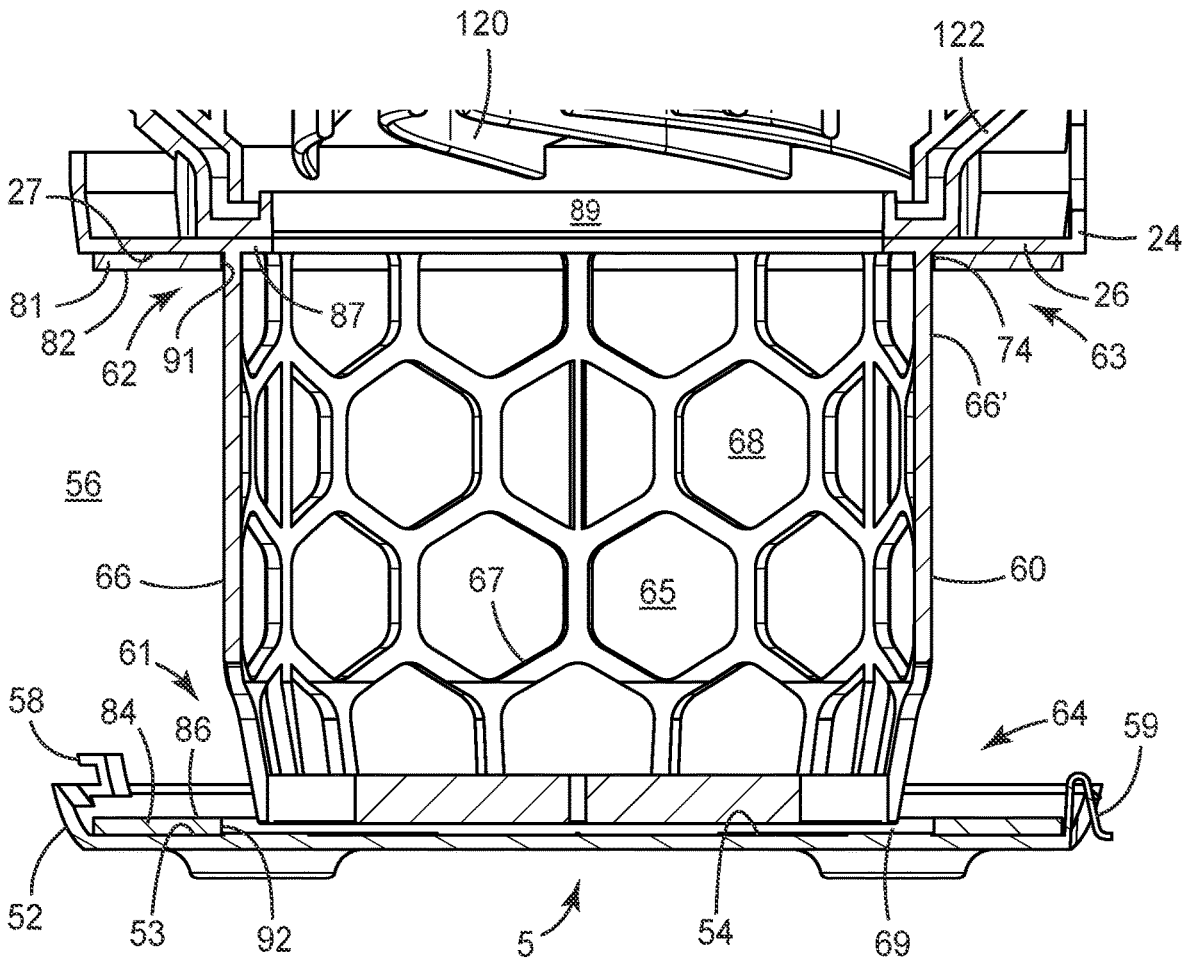
FIG. 7 is a front cross-sectional view of various components of an exemplary room air purifier.

In some embodiments, mandrel 60 may comprise a lower portion 64 that may also be air-transmissive in the manner described above and may be quite similar to upper portion 63 (indeed, in many convenient embodiments lower portion 64 may be an integral extension of upper portion 63) excepting that lower portion 64 is tapered at least slightly radially inwardly. By tapered radially inwardly is meant that a lower end 61 of mandrel 60, as defined by tapered portion 64, exhibits a diameter that is smaller than the diameter of upper portion 63 of mandrel 60. Lower portion 64 may thus exhibit a frustoconical shape as evident e.g. in FIG. 7. Lower portion 64 may be radially inwardly tapered at any suitable taper angle (measured relative to the vertical axis of mandrel 60). In some embodiments, this taper angle may be at least 4, 6, 8, 10, 15, or 20 degrees; in further embodiments, this taper angle may be at most 30, 20, 16, 14 or 12 degrees. (By way of a specific example, the taper angle of the exemplary portion 64 as depicted in FIG. 7 is in the range of approximately 10-12 degrees.) The taper may be such that the diameter of the lower end of lower portion 64 (i.e., the diameter of lower end 61 of mandrel 60) is from at least 75, 80, 85, 88, 90, or 92%, to at most 98, 97, 96, 95, or 94%, of the diameter of upper portion 63 of mandrel 60. (By way of a specific example, in the exemplary depiction of FIG. 7 the diameter of lower end 61 appears to be in the range of 92-94% of the diameter of upper portion 63.) In some embodiments, such tapering may enhance the ease with which an air filter 100 may be slidably installed onto mandrel 60, as discussed later herein.

Mandrel 60 comprises a first, lower end 61 and a second, upper end 62. In the depicted embodiment of FIG. 3, upper end 62 of mandrel 60 is attached to the previously-described waistpiece 24 of the upper portion 20 of the room air purifier. In some embodiments, the mandrel 60 and waistpiece 24 may be integral with each other; that is, they are parts of a single unitary structure made in a single operation (e.g., by injection molding). Regardless of the particular method of assembly, mandrel 60 will be non-detachably attached to waistpiece 24, which in turn is non-detachably attached to other components of upper portion 20 of the room air purifier. (For example, waistpiece 24 may be non-detachably attached to fan shroud 122 and/or to upper housing piece 21.) Thus, mandrel 60 will reside generally within lower portion 50 of the room air purifier (as evident from comparison of FIGS. 2 and 3) but is non-detachably attached to the upper portion 20 of the room air purifier. So, for purposes of description mandrel 60 will be considered to be a component of upper portion 20, e.g. in phrasing such as "upper portion 20 comprises mandrel 60". Thus in some embodiments, at least a portion of floor 26 of waistpiece 24 may be integral with mandrel 60, e.g. with an upper end 62 of mandrel 60 having an integral junction with floor 26.

Figure 4:
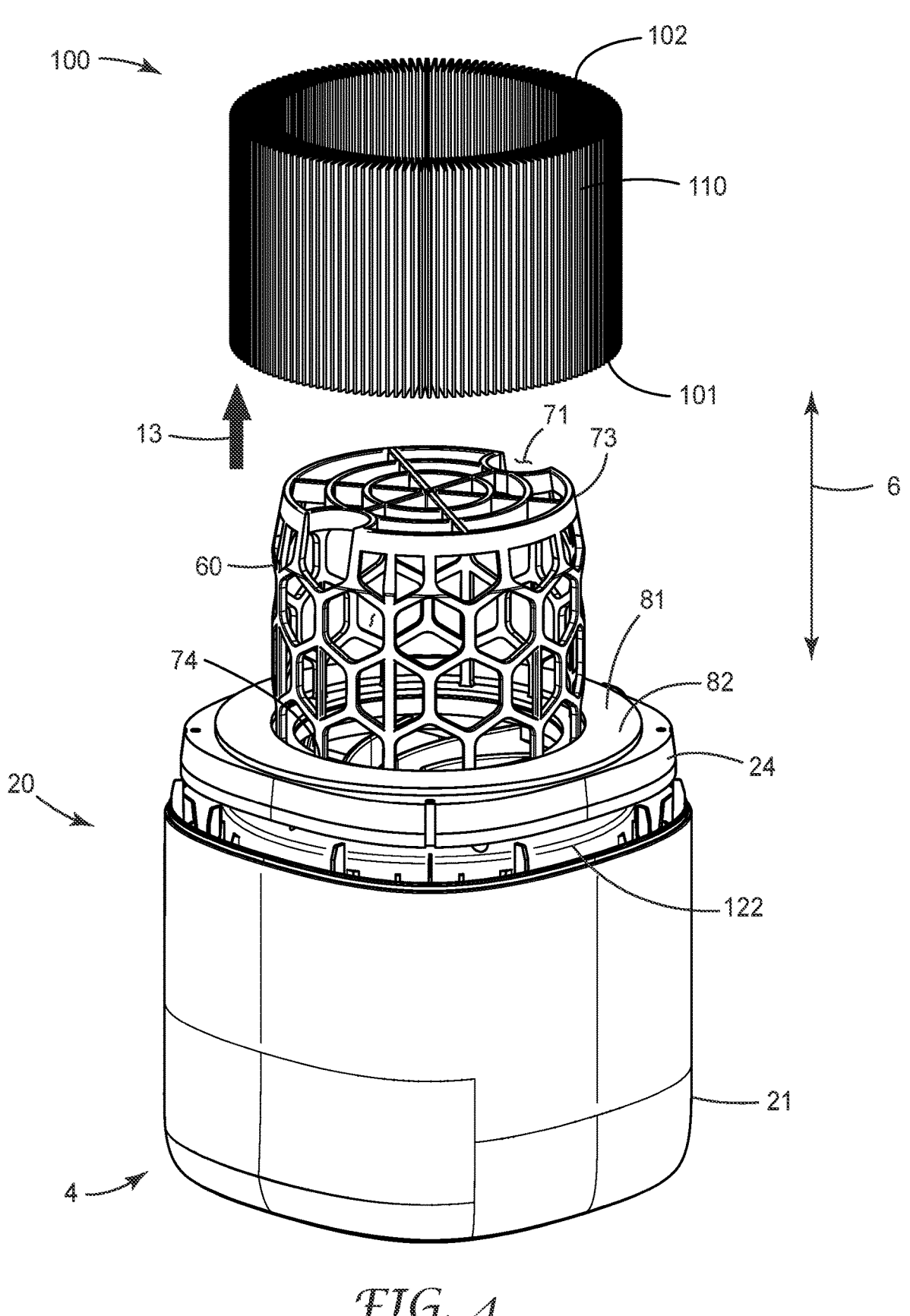
FIG. 4 is a perspective view of various components of an exemplary room air purifier that has been temporarily inverted so that a pleated air filter can be slidably removed, with a lower housing piece and floor panel omitted.

An air filter 100 that is configured to be installed into room air purifier 1 is shown in exemplary embodiment in FIGS. 3 and 4. As installed, air filter 100 will be in generally cylindrical form and will define a generally cylindrical interior air space 103 that will receive the air that is filtered through the filter media 110 of air filter 100. (When the air filter is installed in the room air purifier, air space 103 will generally coincide with the previously-described filtered-air space 65 defined within mandrel 60.)

In some embodiments, installation of air filter 100 onto mandrel 60 can involve slidably moving air filter 100 onto mandrel 60, e.g. by positioning an end of the air filter over the lower end 61 of mandrel 60 and then sliding the air filter over the mandrel. In some embodiments, this will be preceded by inverting the room air purifier so that is temporarily rests on its upper end 4 (e.g. on grill 28) and by detaching the previously-described floor panel 52 to expose an opening 47 previously occupied by floor panel 52. A user can then reach into the opening and grasp the air filter and pull the filter upward to slidably remove the filter from the (inverted) room air purifier, in the general manner illustrated by arrow 13 in FIG. 4. In some embodiments, mandrel 60 may comprise one or more (in the depicted case, two) features (e.g. in the form of notches) 71 to facilitate grasping of the air filter in order to slidably remove the air filter from the mandrel, although may not be needed in some cases. In some embodiments, mandrel 60 may be oriented with respect to lower housing piece 51 so that any such notch 71 is located in a corner of lower housing piece 51, so as to provide a slight amount of additional room for the user's fingers.

Figure 9:
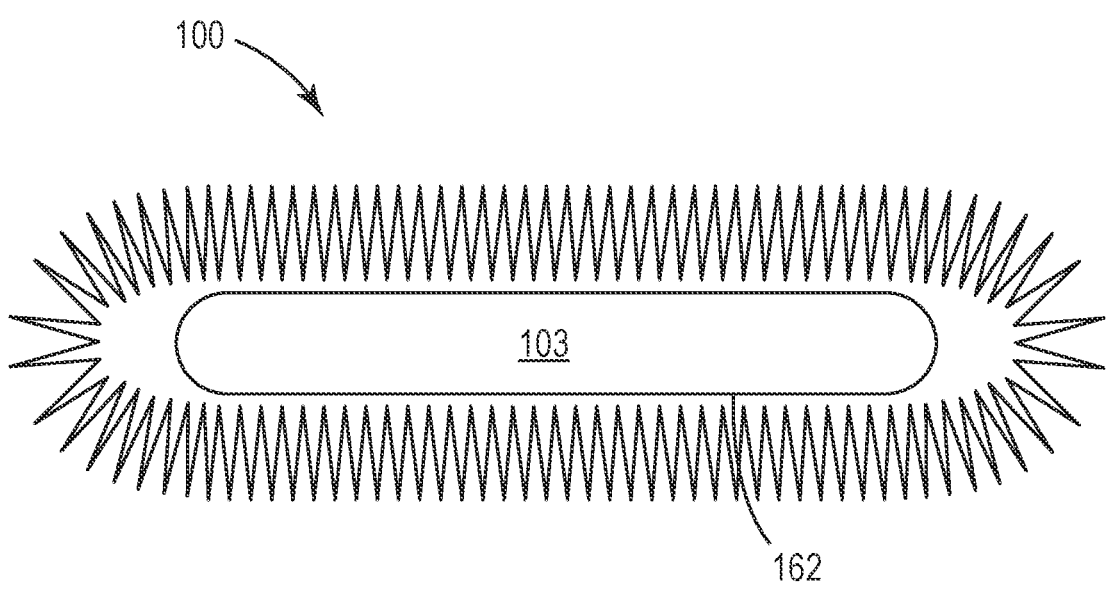
FIG. 9 is a side view of an exemplary air filter in a compacted condition.

In some embodiments the air filter may be provided with one or more graspable removal tabs, located e.g. on generally diametrically opposing sides of the air filter, so that the air filter media itself need not be directly grasped or even contacted. In some embodiments, an air filter may be removed while maintaining the room air purifier in its upright (operating) orientation, removing the floor panel 52 in the general manner shown in FIG. 2, and then e.g. shaking the room air purifier slightly to allow the air filter to slide off the mandrel in the general manner illustrated in FIG. 4. (The room air purifier may then be inverted in order to most easily install a replacement filter.) In some embodiments an air filter may be provided in a compacted, e.g. partially flattened, shape as shown in FIG. 9 and as discussed later herein; if so, it will be expanded to its generally cylindrical shape in order to be slidably installed onto the mandrel. As noted, in some embodiments an lower portion 64 of mandrel 60 may be slightly tapered to enhance the ease of sliding the air filter onto the mandrel.

In at least some embodiments, an air filter 100 that is installed in room air purifier 1 will be a pleated air filter. By this is meant that the air filter comprises filter media 110 that is pleated into rows of oppositely oriented pleats comprising panels and oppositely-facing pleat tips. In some embodiments, air filter 100 may be produced by obtaining an appropriate air filter media 110, pleating the air filter media, and dividing the media into appropriate sizes. The media may be cut into a desired length along a direction that is perpendicular to the pleat direction PD); and, into a desired width along the pleat direction. The media will thus have a length axis and a width axis; this "width" is aligned with the pleat direction PD. The pleat direction PD will correspond to the vertical ("height") direction of the filter as installed in the room air purifier and will be aligned with the aforementioned vertical axis 6 of the room air purifier, e.g. as depicted in FIG. 3.

The media, as appropriately shaped and sized, can be formed into a generally cylindrical configuration (e.g. of the general type depicted in FIG. 3) by joining terminal lengthwise ends of the media to each other. This can be done in any suitable manner, e.g. by ultrasonically welding one or more end panels of one end of the media to one or more end panels of the other, opposing end of the media. In various embodiments, any suitable method of joining may be used, e.g. adhesive bonding, mechanical bonding using any suitable mechanical fastener(s), etc. In some embodiments, multiple such methods may be used, in combination.

The result will be a generally cylindrical air filter 100 as depicted in FIG. 3. The air filter will comprise a radially-inward major side and surface 104 with radially-inward pleat tips 106 and a radially-outward major side 105 with radially-outward pleat tips 107. The cylindrical air filter 100 will exhibit a width (height) which will be aligned with the pleat direction PD and, with the air filter installed in the room air purifier, will be aligned with the vertical axis of the room air purifier. This width can be any appropriate amount, but will be purposefully chosen so that the interaction of the pleated air filter with the herein-disclosed integrated resilient gaskets of the room air purifier will be achieved as discussed in detail later herein. In various embodiments, the width of the air filter may be at least 80, 90, 100, 110, or 120 mm; in further embodiments, the width may be at most 350, 300, 250, 200, 180, 160, 150, or 140 mm.

The air filter, when in a cylindrical configuration e.g. as installed on mandrel 60, will exhibit an inner diameter (e.g. defined collectively by the inward pleat tips 106) and an outer diameter (e.g. defined collectively by the outward pleat tips 107). In various embodiments, the inner diameter may be at least 80, 100, 110, 120, 140, or 155 mm; in further embodiments, the inner diameter may be at most 180, 160, 140, or 130 mm. In various embodiments, the outer diameter may be at least 120, 140, 160, or 180 mm; in further embodiments, the outer diameter may be at most 220, 200, 180, or 170 mm. (Whatever the specific dimensions, the outer diameter will always be greater than the inner diameter; typically, by a value approximating the pleat height, as defined and described later herein.) The filter media 110 (and thus air filter 100) will exhibit upper and lower corrugated edges 101 and 102 as denoted in FIG. 3. These corrugated edges define the widthwise terminal ends of the pleated media (i.e. along the "height" of the filter as installed).

By definition, an air filter 100 that is installed in room air purifier 1 is unframed. By this is meant that as supplied to an end user (e.g. a homeowner), the air filter media 110 of air filter 100 is not equipped with any rigidifying frame or support member or members (whether in the form of discrete members, or with the members being connected to each other) that maintain the air filter in a permanently cylindrical shape. In particular, an unframed air filter as disclosed herein does not encompass so-called cartridge filters in which a generally cylindrical filter media is at least partially enclosed within a generally cylindrical rigid or semi-rigid support structure, whether in the form of a complete housing, a set of spaced rigid support members, and so on. Further in particular, an unframed air filter does not comprise rigid or semi-rigid endcaps (e.g. in the form of molded, circular or annular pieces) of the general type that are often mounted on the corrugated edges of a cylindrical, pleated air filter media. Examples of support frames, housings, endcaps, and the like, that are not permitted on an unframed pleated air filter as disclosed herein, can be found e.g. in U.S. Pat. Nos. 7,628,837 and 8,973,761 and in U.S. Patent Application Publication 2003/0168400. Still further, by definition an unframed air filter as disclosed herein will not comprise any gaskets, sealing members, beads of sealing or potting material, or the like (e.g. of the type that are often used at the junctions of corrugated edges of pleated air filters with endcaps mounted thereon).

Not only will an air filter as disclosed herein be unframed, in at least some embodiments it will be compactable. By this is meant that the air filter can be reversibly compacted (e.g. partially flattened) from a fully cylindrical shape (i.e. a shape such as shown in FIG. 3, in which the air filter is slidable onto a mandrel) into a compacted shape of the general type illustrated in FIG. 9. By definition, a compactable air filter can be flattened into a shape in which the interior air space 103 defined within the compacted air filter will exhibit a volume that is less than 40% of the nominal volume of this interior air space when the air filter is when its fully cylindrical shape. This volumetric ratio will be referred to herein as a volumetric compaction ratio. For ease of calculation, the nominal volumes used in these evaluations may be calculated using the approximate dimensions defined by the radially-inward pleat tips and may disregard the small volume of air that is present in the radially-inward pleat valleys. In various embodiments, the air filter may be compactable so as to exhibit a volumetric compaction ratio that is equal to or less than 30, 25, 20, or even 15%. By way of a specific example, if an air filter with a nominal inner diameter of 12.5 cm when fully cylindrical is compactable to a condition in which it defines an oblong interior air space 103 (of the general shape shown in FIG. 9) of roughly 19×1 cm, the filter will exhibit a volumetric compaction ratio of approximately 15%. It will be appreciated that this compactability can allow significant savings in the ability to package, ship, and inventory air filters in large quantities. For example, a shipping, storage, and/or retail-display container may include a set of e.g. two, four, six, eight, or more compacted filters, and will occupy far less volume than would be the case if the air filters were not compacted.

By definition, an unframed and compactable air filter as disclosed herein can be compacted and stored indefinitely in the compacted condition, and can then be re-expanded to its fully cylindrical shape for installation onto a mandrel, without any damage to the filter media or impact on its filtering performance. Typically, the compacting of the air filter will take the form of the filter becoming elongated in one direction and becoming shortened in another direction that was previously substantially perpendicular to the elongation direction. In other words, when viewed along the pleat direction of the pleated air filter as in FIG. 9, a compacted air filter will often exhibit an oblong shape, e.g. an elongated "stadium" shape (such a shape is sometimes referred to as a pill shape or a discorectangle).

In such a case, the more centrally-located portions of the compacted air filter may become rather linear in overall shape and thus may exhibit a pleat spacing that is quite close to the above-discussed nominal value, as evident in FIG. 9. In contrast, the extreme end portions of the compacted air filter may exhibit a very sharp (small) radius of curvature so that the radially-inward pleat tips are at their nominal pleat spacing or slightly compressed together, and so that the radially-outward pleat tips are at a quite large pleat spacing (e.g. as much as 1.5, 2, 3, 4 or more times the nominal pleat spacing), also as evident in FIG. 9. In some embodiments, a spacer 162 (e.g. an oblong, hollow entity made of e.g. cardboard, or an air-filled pillow or a section of bubble wrap) may be inserted into the interior air space 103 of the compacted air filter in the general manner depicted in FIG. 9. This can ensure that the air filter media is not compacted to too great an extent or in a manner that permanently distorts the pleated media. Again, the herein-described compaction will not permanently damage the pleated media, will not permanently change the shape of the individual pleats to an unacceptable extent, and so on.

Room air purifier 1 will comprise an integrated, resilient upper gasket 81 as visible in exemplary embodiment in FIG.

3. Room air purifier 1 will also comprise an integrated, resilient lower gasket 84 as visible in exemplary embodiment in FIGS. 2 and 6. By integrated is meant that gaskets 81 and 84 are components (e.g. permanent or at least quasi-permanent components, as discussed below) of room air purifier 1 rather than being components of an air filter (disposable or otherwise) that is installed into room air purifier 1. In many embodiments, gaskets 81 and/or 84 may be attached, e.g. quasi-permanently attached, to room air purifier 1, so that they cannot be removed therefrom, as discussed in detail below. By resilient is meant that a gasket is made of a material that exhibits a modified Compression Force Deflection value, at 50% compression, of 1.6 psi or less, and/or that exhibits a Shore hardness of 60 or less on the OO scale, both as discussed in detail later herein (and all such testing to be performed at 22° C.). Upper gasket 81 will be positioned (e.g. disposed on a downward-facing gasket-seating surface 27 of floor 26 of waistpiece 24) so that when a pleated air filter 100 is disposed on mandrel 60 and installed in the room air purifier, an upper corrugated edge 101 of the pleated air filter is abutted against a lower surface 82 of upper gasket 81. Similarly, lower gasket 84 will be positioned (e.g. disposed on an upward-facing gasket-seating area 53 of the upward-facing surface 54 of floor panel 52) so that a lower corrugated edge 102 of the pleated air filter is abutted against an upper surface 86 of the lower gasket.

The room air purifier, the integrated, resilient gaskets of the room air purifier, and the pleated air filter, will be configured so that when the floor panel 52 is joined to the lower housing piece 51 to form the operational room air purifier 1, the upper and lower corrugated edges 101 and 102 of the air filter will be respectively pressed against the lower and upper surfaces 82 and 86 of upper and lower resilient gaskets 81 and 84. Gaskets 81 and 84 will be configured (e.g., in the form of annular rings) so that this occurs along the entire circumferential extent of the upper and lower corrugated edges 101 and 102 of the air filter.

A primary purpose of upper and lower gaskets 81 and 84 is to minimize, e.g. to at least substantially prevent, leakage of unfiltered air around the upper and lower corrugated edges 101 and 102 of the air filter. Accordingly, each gasket will have properties (e.g. resilience and thickness) that allow the edges of the air filter to not only fit firmly against the gasket, but also to at least slightly deform (locally compress) the gasket. In other words, the corrugated edges of the air filter will locally penetrate at least slightly into the resilient gasket. By definition, a resilient gasket is configured so that when a corrugated edge of a pleated filter media is urged against the gasket by the forces generated in the acts of joining the floor panel 52 to the lower housing piece 51 and holding the floor panel and the lower housing piece together, the gasket will be locally compressed a distance that is at least 10% of the nominal local thickness of the gasket. This ratio will be referred to herein as a compression factor; the compression distance is the distance that the corrugated edge penetrates into the gasket and the nominal local thickness is the local thickness of the gasket in the absence of any deforming force. By way of specific examples, if the pressing of a corrugated edge of a pleated filter media against a gasket of nominal 3.0 mm thickness causes the gasket to be locally compressed (i.e., the corrugated edge penetrates into the gasket) a distance of 1.0 mm, the compression factor is 33%; if the compression/penetration is 1.5 mm, the compression factor is 50%.

In various embodiments, a resilient gasket may exhibit a compression factor of at least 15, 20, 25, 30, 35, 40, 45, or 50%. In further embodiments, a resilient gasket may exhibit a compression factor of at most 80, 70, 60, or 55%. By comparison, abutting a corrugated edge of a pleated air filter against a conventional non-resilient item (e.g. against an injection-molded part made of a commonly used, non-resilient molding resin such as e.g. polycarbonate, polyamide, polyoxymethylene, and so on) will result in very little or no observable deformation/compression of the non-resilient item.

The present investigations have revealed that abutting the corrugated edges of a pleated filter media against resilient gaskets of a room air purifier in the general manner disclosed herein can significantly enhance the filtration efficiency of the room air purifier (e.g. as characterized by a Percent Penetration of airborne particles, as discussed later herein), apparently by minimizing air leaks around the corrugated edges of the pleated filter media.

Those of ordinary skill in the art of designing air filters will understand that for air filters to exhibit high filtration efficiency, the edges of the filter media are often disposed within perimeter frames and/or are sealed e.g. with a potting material, sealant, gasket, or the like, to reduce air leaks to a point that can enable high efficiency to be achieved. Thus for example, high efficiency cylindrical pleated air filters are often provided in the form of a cartridge filter in which the corrugated edges of the pleated air filter are fitted with endcaps, with a sealant, caulk, potting material, or the like being used at the meeting-point of the corrugated edges of the pleated filter media with the inward surfaces of the endcaps to minimize air leaks. Such arrangements are produced at the factory, during manufacturing of the cartridge filter, so that the sealing arrangements can be implemented with great fidelity and care. Such sealing arrangements are also permanent.

In the present case, significantly enhanced efficiency of air filtration can be achieved without resorting to arrangements in which a cylindrical, pleated air filter media e.g. is sealed within a set of endcaps at the factory. Rather, the "sealing" is performed by an end user, during the process of installing the air filter in the room air purifier, rather than during the manufacture of the air filter. Also, the "sealing" is non-permanent (only lasting until the current filter is removed), with a new "seal" being established when a replacement filter is installed. (It is also noted that the herein-described "sealing" would not necessarily be expected to provide a "hermetic" seal in a manner achievable e.g. by the deposition and hardening of caulking material or sealant in a carefully-controlled, factory process.)

Without wishing to be limited by any proposed theory or mechanism, it is postulated that the use of a resilient gasket as disclosed herein can minimize air leakage, and thus enhance the efficiency of air filtration, in at least two ways. First, the ability of the gasket material to be resiliently compressed can allow the gasket to adjust to, and compensate for, any small irregularities that may be present in the corrugated edge of the pleated filter media and/or on the surface of the room air purifier component that underlies the gasket. Second, the compressibility of the gasket material can allow the corrugated edge of the pleated filter media to locally compress the gasket material and thus to penetrate at least slightly into the gasket material. This can serve to hold the corrugated edge of the pleated media in position so that the edge does not deform under the local air pressure differential that occurs during air filtration. Even slight local deformations of an edge of a filter media may be sufficient to introduce air leaks; therefore, the ability of the gasket to stabilize the corrugated edges of the pleated filter media against deformation under differential air pressure may be helpful. Whatever the underlying mechanism or mechanisms, the arrangements disclosed herein may be particularly beneficial at a corrugated edge of the pleated air filter (an upper end, in the exemplary arrangements depicted in the Figures herein) that resides on a tapered end of a mandrel, such that the corrugated edges of the pleated filter media are not locally supported by the mandrel.

In various embodiments, an upper or lower gasket may be at least 1.0, 2.0, or 2.5 mm in thickness (which will correspond to the vertical direction of the room air purifier). In further embodiments, an upper or lower gasket may be at most 10, 8, 6 or 4 mm in thickness (these values refer to the nominal thickness of the gasket in the absence of any deforming force).

In some embodiments, an upper or lower gasket may be made of a foam material, e.g. an elastomeric organic polymeric material such as polyurethane or an elastomeric polymeric material such as polysiloxane). In various embodiments, such a foam may exhibit a density of less than 0.8, 0.6, 0.4, 0.2, or 0.1 grams per cubic centimeter. In various embodiments, a foam may be used that does not comprise a thin, non-porous skin at one or both major surfaces thereof; in other embodiments, a foam may be used that includes a thin non-porous skin at one or both major surfaces thereof. In some embodiments, such a foam may be a closed cell foam. However, this may not be strictly necessary. Rather, in some instances an open-cell foam has been found to function satisfactorily. Even though such a material may be considered to have through-passages (by way of the interconnected, open cells), it may be that under the deformation pressure applied by the corrugated edges of the pleated filter media, the foam material may locally compress and collapse to the point that few or no such through-passages remain. It is thus noted that various resiliently compressible fibrous materials (e.g. non-woven webs and the like) may be useful as gaskets for the uses herein, regardless of whether they are considered to be extremely airflow-resistive in their uncompressed state.

In some embodiments, a gasket may be comprised of a solid material of suitable softness and resilience. For example a gasket may take the form of a silicone sheet (e.g. a ring or annular disc) that is solid in the sense of having little porosity (e.g., that exhibits a density of at least 0.8, 0.9, or 0.95 grams per cubic centimeter), but that may exhibit very soft, e.g. gel-like, properties.

In some embodiments the material of which a resilient gasket is made may be characterized by a so-called Compression Force Deflection value (CFD; sometimes referred to as a Compression Load Deflection (CLD) value). Such a parameter may be measured in generally similar manner to the procedures outlined in ASTM D3574C, for example using equipment and procedures as described in the section entitled "ASTM D3574 Testing Equipment for Flexible Cellular Urethane Foams, Test C" of the website www.testresources.net. Such testing for the purposes herein will be performed at 50% compression and will use a modified version of the test in which compression is performed at a rate of 5 mm per minute rather than the ASTM standard rate of 50 mm per minute. (Such a modified CFD/CLD test is referred to e.g. in the Material Summary Sheets for foam materials available from Aearo Technologies/3M under the trade designation E-A-R CONFOR EG FOAM.) In various embodiments, a resilient gasket may be made of a material that exhibits a modified Compression Force Deflection (CFD) value, at 50% compression, of less than or equal to 1.6, 1.2, 1.0, 0.8, 0.6, 0.4, 0.3, or 0.25 psi (noting that a lower CFD value indicates a material that is more easily compressed). In further embodiments, a resilient gasket may be made of a material that exhibits a modified Compression Force Deflection value, at 50% compression, of greater than 0.1 psi.

A modified Compression Force Deflection value may be most suited for characterization of gasket materials that are high-porosity foams. Some materials that are potentially usable as a resilient gasket are low porosity materials (e.g. soft silicone sheets, gels and the like) that may be more easily characterized by way of a Shore hardness value. Thus in various embodiments, a resilient gasket may be made of a material that exhibits a Shore hardness value, on the OO scale, of less than or equal to 60, 50, 40, 30, 20, or 10. In further embodiments, the resilient gasket may be made of a material that exhibits a OO-scale Shore hardness of at least 1 or 5.

The properties of the herein-disclosed gaskets (e.g. their resiliency in terms of modified CFD and/or Shore hardness, and their thickness) may be chosen in combination with the extent to which the joining together of the floor panel 52 with the lower housing piece 51 of the room air purifier exerts a force on the gaskets, to provide that a suitable value of local compression of each gasket occurs. As noted earlier, in various embodiments, a resilient gasket may be locally compressed a distance that is at least 5, 10, 15, 20, 30, 40, or 50% of the nominal local thickness of the gasket; in further embodiments, a resilient gasket may be locally compressed a distance that is at most 80, 70, 60, or 55% of the nominal local thickness of the gasket. By way of a specific example, the present work has identified potentially suitable arrangements that use upper and lower foam gaskets of approximately 3.0 mm in nominal thickness, configured so that the joining together of the floor panel 52 with the lower housing piece 51 of the room air purifier with a pleated air filter installed therein, causes each of the gaskets to be compressed in an amount approximately 50% of the nominal local thickness. (In other words, the corrugated edges will penetrate approximately 1.5 mm into the 3.0 mm thickness of each gasket.) It is noted however that this is not expected to be the only suitable arrangement.

Gasket materials that may be suitable for the above-described arrangements include e.g. the materials available from Aearo Technologies/3M under the trade designation E-A-R CONFOR EG FOAM (e.g. CFNT-EGS, CF-40EG, CF-42EG, CF-45EG, and/or CF-47EG), and the materials available from INOAC Corporation, Nagoya, Japan, under the trade designation CALMFLEX F90G.

The exemplary design depicted in most figures herein uses a mandrel 60 that is tapered at its lower end, such that the lower corrugated edge 102 of the pleated air filter media is not directly supported by the mandrel in the way that the upper corrugated edge 101 is supported. With these considerations in mind, in some embodiments a gasket of higher compressibility (that is, a material that is more easily compressed) and/or greater thickness may be used at the lower corrugated edge of the pleated media, if it is most needed there, with a gasket of lower compressibility and/or smaller thickness being used at the lower end, if the need is less. Thus it may not be necessary that the upper and lower gaskets be identical to each other in compressibility, resiliency, thickness, or any other property. Rather, in some embodiments a mixed-gasket arrangement may be used.

In various embodiments, a gasket material may be chosen that exhibits a compression set that is desirably low, so that the gasket material exhibits little or no tendency to permanently deform under the pressure of the corrugated edge of the pleated filter media. Thus in various embodiments, a gasket material may exhibit a compression set (measured e.g. in similar manner as outlined in ASTM D3574 Testing Equipment for Flexible Cellular Urethane Foams, Test D), of less than 8, 6, 4, 2 or 1%.

Such a property may be relevant since gaskets as disclosed herein are integrated components of the room air purifier. Such gaskets may thus serve over the lifetime of the room air purifier rather than merely over the lifetime of a single air filter that is used in the room air purifier. It will thus be helpful for the gaskets to exhibit little long-term compression set or creep. In this regard it is noted that each successive air filter will likely not be installed in the exact same rotational orientation as the previous air filter, with the result that the corrugated edges of a later-installed pleated filter media will not be likely to be abutted against the exact same locations of the gaskets as were the corrugated edges of an earlier-installed pleated filter media. This may be helpful in minimizing the possibility of any particular area of the gasket developing compression set.

An upper gasket 81 will be mounted in the room air purifier so that the upper corrugated edge 101 of the pleated filter media will be abutted, and in fact pressed, against the lower surface 82 of the upper gasket. Similarly, a lower gasket 84 may be mounted so that the lower corrugated edge 102 of the pleated filter media will be abutted, in fact pressed, against the upper surface 86 of the lower gasket. By way of specific examples, in some embodiments an upper gasket 81 may be disposed on an annular seating surface 27 of the upper portion 20; in some embodiments a lower gasket 84 may similarly be disposed on an annular seating surface 53 of the floor panel 52 of the lower portion. Thus in some embodiments, upper and lower gaskets may take the general form of annular rings or discs as shown in exemplary embodiment in various figures herein. In the depicted embodiment seen in FIGS. 3 and 4, an upper gasket 81 is disposed on a downward-facing gasket-seating surface 27 of waistpiece 24 of upper portion 20. The upper gasket may be attached to a seating surface using any suitable method, e.g. by adhesively bonding an upper surface of the gasket to the seating surface (whether by the use of a curable liquid adhesive, a pressure-sensitive adhesive, and so on), by ultrasonic bonding, by a mechanical fastening method relying on e.g. a hook-and-loop fastening system, and so on.

In various embodiments, the attachment of a gasket to a seating surface may be permanent (e.g. so that the gasket cannot be removed without destroying or unacceptably damaging the gasket) or detachable (e.g. so that the gasket can be removed and replaced). In some embodiments, an adhesive (e.g. a pressure-sensitive adhesive) that is used to bond a gasket to a seating surface may comprise differential bonding with the strong-bond surface of the adhesive being bonded to the gasket and with the weaker-bond surface of the adhesive being bonded to the seating surface. Such arrangements may be useful e.g. in embodiments in which the room air purifier is configured so that an end user can remove a used gasket and replace it with a fresh gasket.

Figures 5, 6:
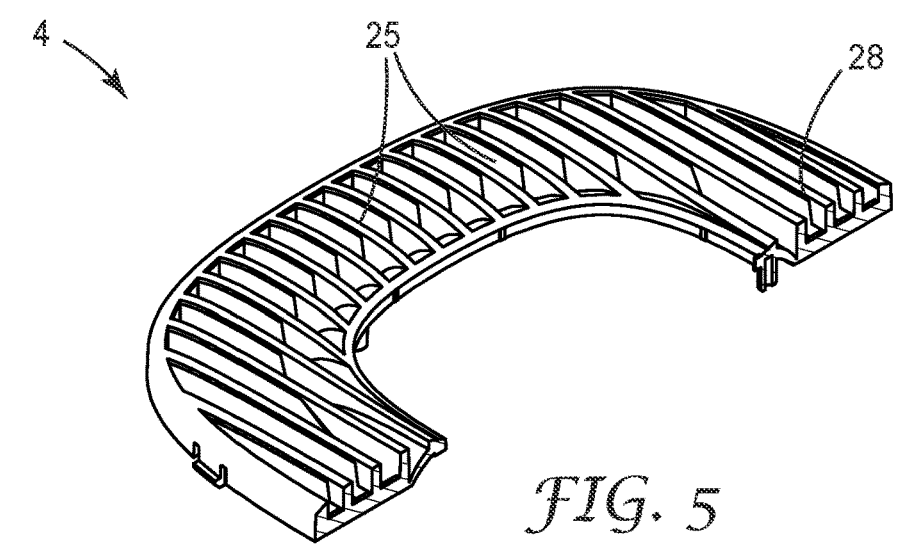
FIG. 5 is a perspective cross-sectional view of an exemplary grill of an air outlet of a room air purifier.
FIG. 6 is a perspective view of an exemplary waistpiece, mandrel, and floor panel of a room air purifier.

In the depicted embodiment seen in FIGS. 2 and 6, a lower gasket 84 is disposed on a gasket-seating area 53 of the upward-facing surface 54 of previously-described floor panel 52 (floor panel 52 being detachable from the lower housing piece 51 of the room air purifier). Lower gasket 84 can be attached to this seating surface by any suitable method including the examples provided above; for example, the lower surface of gasket 84 may be adhesively bonded to seating surface 53. In such an embodiment, after the pleated air filter is installed onto the mandrel and the floor panel 52 is attached to the lower housing piece 51, a configuration will be achieved similar to that shown in FIG. 6 (noting that lower housing piece 51, air filter 100, and the entirety of the upper portion of the room air purifier are except for waistpiece 24, are all omitted from FIG. 6 so that the remaining items can be easily seen.) In such a configuration, the air filter will reside in the space visible in FIG. 6 that is radially outward of the mandrel, and is vertically between the upper and lower gaskets 81 and 84, with the air filter being pressed between the gaskets as described herein. (This space in which the air filter will reside is also visible in FIG. 7.)

Lower gasket 84 that is mounted on floor panel 52 that is detachable from lower housing piece 51 of the room air purifier, will still be considered to be an "integrated" gasket of the room air purifier. That is, notwithstanding that the floor panel to which the gasket is attached may be temporarily removable from the room air purifier, the gasket is considered to be a permanent component of the room air purifier, not a component of an air filter that is installed into the room air purifier. It is also noted that, strictly speaking, a lower gasket 84 may not necessarily need to take the form of an annular ring in the general manner described above. Rather, in some embodiments a lower gasket 84 could take the form of an e.g. generally circular piece that covers some or all of the area of floor 54 that is visible within the annular space defined by gasket 84 in FIG. 2. In some embodiments, such a gasket, rather than being generally circular, could be shaped (e.g. as a square with rounded corners, a squircle, and so on) to fit closely in the area bounded by the radially-outward upturned edges of floor panel 52. Any such arrangements may be acceptable as long as the gasket is positioned to fully occlude the lower corrugated edge of the pleated air filter in the manner discussed earlier herein. However, in at least some embodiments it may be preferable for lower gasket 84 to exhibit a generally annular shape (as in FIG. 2) so that the lower end of mandrel 60 does not come into contact with lower gasket 84, for reasons that will be made clear in discussions later herein.

As noted, upper and lower gaskets may typically take the form of annular rings or discs as shown in general manner in various figures herein. In some embodiments a gasket may be provided by multiple annular ring segments that are abutted together in an end-to-end circumferential manner to collectively provide an annular ring. In various embodiments, two, three, four, or more segments may be used. Such arrangements may result in less wastage of gasket material (i.e., less "weed" from the process of cutting the rings or ring segments from a sheet of gasket material) than if single annular rings are used. It is expected that as long as the circumferential ends of the segments are abutted close together, e.g. firmly against each other, there should be minimal effect on the ability of the gaskets to function as disclosed herein. In some embodiments, the abutment interfaces between ends of gasket segments may be substantially straight; in other embodiments, the abutment interfaces may be non-linear, e.g. notched, sawtoothed, interlocking or interdigitated.

In some embodiments, the upper and lower gaskets 81 and 84 may be permanently installed in the room air purifier; e.g. they may be permanently bonded or otherwise permanently attached to their respective gasket-seating surfaces 27 and 53. Or, in some embodiments the gaskets may be replaceable. This may depend on the gasket material that is used, e.g. its durability and resistance to compression set. Even for gaskets that are configured to be replaceable, it is envisioned that in many embodiments the gaskets will be replaced on a schedule that is less frequent than the schedule at which the air filter is replaced. (Nevertheless, in some embodiments, replacement air filters may be sold as kits that include replacement gaskets, e.g. along with instructions and so on.) In some embodiments, replacement gaskets may be provided e.g. as annular rings or segments thereof, which comprise the gasket material e.g. with a pressure-sensitive adhesive layer on a major surface thereof, so that the gasket can be mounted to a seating surface of the room air purifier via the pressure-sensitive adhesive.

The possibility that in some embodiments a gasket might be replaceable is the reason for the earlier designation that such gaskets are at least a "quasi-permanent" component of the room air purifier. It is emphasized that even if a gasket is configured to be replaceable, the gasket is an integrated component of the room air purifier, not of the air filter that is installed therein. As such, a gasket, whether original or a replacement, will not be provided to an end user for installation into a room air purifier, in a form in which it is attached (permanently or otherwise) to an air filter.

When installed onto the previously-described mandrel 60, the pleated air filter 100 will be positioned radially-outwardly of the radially-outward surface 66 of the mandrel as evident in FIG. 3. Typically, at least some portions of at least some radially-inward pleat tips 106 of the air filter may be in contact with, e.g. abut against, the radially-outward surface 66 of the mandrel. Also as described earlier herein, pleated air filter 100 will be positioned so that lower corrugated edge 102 of air filter 100 is abutted against upper surface 86 of lower gasket 84. It can be helpful (e.g. to minimize air leaks around lower corrugated edge 102 of the pleated air filter) to provide that with the pleated air filter installed, the inward pleat tips 106 of the pleated air filter do not extend radially inward beyond the radially-inward edge of lower gasket 84.

Thus in some embodiments, air filter 100, mandrel 60, and lower gasket 84 may be configured so that the radially-inward edge 92 of lower gasket 84 (denoted in FIGS. 6 and 7) is positioned radially inwardly of all radially-inward pleat tips 106 of pleated air filter 100. In order to accomplish this, mandrel 60 may be configured so that the radially-outward-most surface 73 of the lower terminus of mandrel 60 (denoted in FIGS. 6 and 7) is displaced radially inwardly in comparison to the radially-outward surface 66 of mandrel 60 in locations away from the lower terminus. This can provide space so that the radially-inward edge 92 of lower gasket 84 can be positioned radially inwardly in comparison to radially-outward surface 66 of mandrel 60. Since the radially-inward positioning of the radially-inward pleated tips 106 of air filter 100 will be limited by portions of radially-inward pleat tips 106 being abutted against mandrel surface 66, this will ensure that radially-inward edge 92 of gasket 84 is positioned radially inwardly of the inward pleat tips 106 of pleated filter 100.

It is evident e.g. from FIGS. 6 and 7 that the exemplary arrangements disclosed earlier herein, in which mandrel 60 includes a lower portion 64 that is tapered in the general manner shown in FIGS. 6 and 7, can accomplish such a goal. However, for the present purposes the tapering need not necessarily be performed to such a large extent as in the design shown in FIGS. 6 and 7 (in which the tapering was primarily done for the purpose of ensuring that it is easy to slidably mount air filter 100 onto mandrel 60). For example, in some embodiments the upper end 62 of mandrel 60 may be tapered, recessed, etc., although (since the air filter will not be slidably mounted onto the mandrel from this end) this need not necessarily be performed to the same degree as for the lower end 61.

In general, for such purposes the upper end 62 of mandrel 60 may be configured so that a radially-inward edge 91 of upper gasket 81 is positioned radially inwardly in relation to radially-inward pleat tips 106 of filter 100. This may be achieved by providing that the upper end 62 of mandrel 60 comprises an upper terminus with a radially outwardmost surface 74 (denoted in FIG. 7) that is displaced radially inwardly in comparison to adjacent areas 66' (denoted in FIG. 7) of radially outward surface 66 of mandrel 60. (Such a radially-inwardly displaced arrangement of surface 74 relative to surface 66' is not shown in FIG. 7; this figure is merely used to point out the items, surfaces, etc., that would be involved in such an arrangement.) In some embodiments, such displacement (radially-inward recessing) of surface 74 relative to adjacent surface 66' need not be as pronounced as the lower-end taper shown in FIG. 7. All that may be needed is for surface 74 to be displaced a small amount (e.g. a few mm) radially inwardly. In some embodiments, such displacement may occur over a vertical extent of the mandrel that is fairly short, e.g. is merely sufficient to accommodate the thickness (vertical height) of upper gasket 81. Such an arrangement may be referred to as providing a radially-inwardly-recessed terminus of mandrel 60, rather than a tapered end of mandrel 60. It will be appreciated that any such recessing will typically be present around the entirety of the terminus of the mandrel (akin to how the tapering of the upper end of the mandrel extends around the entirety of the mandrel, as visible in FIGS. 3 and 4).

Many variations of such approaches are possible, as long as the arrangements allow room for the upper and/or lower gaskets to be configured (e.g. sized, shaped and positioned) so that the radially-inward pleat tips of the air filter do not extend radially inward beyond the radially-inward edges of the gaskets. For example, in some embodiments, both ends of a mandrel may be tapered in the general manner of lower end 61 of mandrel 60 as shown in FIGS. 6 and 7, but with a somewhat more pronounced taper being imparted to the mandrel end onto which the air filter is to be initially slidably moved. In terms of the diameter ratios mentioned in the discussions of tapering earlier herein, in some embodiments a tapered mandrel end onto which an air filter is to be initially slidably moved, may exhibit a diameter that is e.g. 97, 96, 94, 92, 90, 88, or 86% (or any intervening numbers within these ranges) of the diameter of a vertically central (untapered) portion of the mandrel. An opposing end of the mandrel, that is opposite from the end onto which the air filter is to be slidably moved (and needing only to provide clearance for a resilient gasket), may exhibit less taper, e.g. so that its diameter is 99, 98, 97, 96, 95, or 94% of the diameter of the central portion of the mandrel. In some particular embodiments, lower end 61 may exhibit a ratio of approximately 95%, with upper end 62 exhibiting a ratio of approximately 97%.

Figure 8:
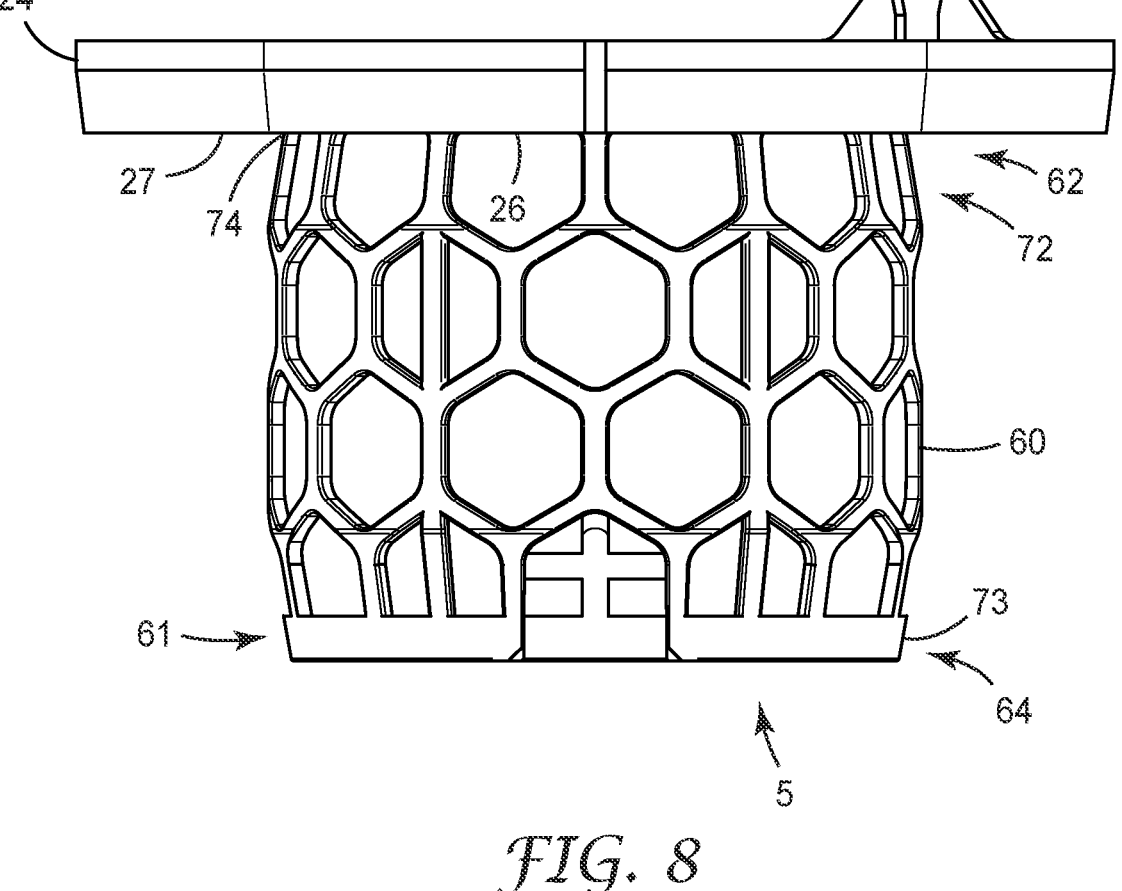
FIG. 8 is a front view of an exemplary mandrel that is tapered at both ends, and that is integral with a waistpiece of the room air purifier.

In some embodiments, a double-tapered mandrel may be symmetrically tapered such that both ends exhibit similar or identical tapering. That is, in some embodiments both ends of the mandrel may exhibit a taper that is similar or identical and that serves equally well for the purpose of allowing an air filter to be slidably inserted onto the mandrel and for the purpose of allowing clearance for a gasket (although any one end of the mandrel may not necessarily need to serve both functions). In various embodiments, a double-tapered mandrel may exhibit a similar or identical diameter at each end that is from at least 92, 93, 94, to 95%, to at most 99, 98, 97, or 96%, of the diameter of the central portion of the mandrel. Any such double-tapered mandrel, whether symmetrically tapered or not, may take the general form shown in FIG. 8, such that the mandrel comprise a lower tapered portion 64 and an upper tapered portion 72.

Any such arrangement may be used as desired. In embodiments in which multiple mandrels and/or pleated air filters are used, either or both ends of either or both mandrels may be recessed in this general manner (The use of multiple mandrels and pleated filters is described in U.S. Provisional Patent Application No. 63/330,874, entitled ROOM AIR PURIFIER WITH INTEGRATED GASKETS, filed even-date herewith, which is incorporated by reference herein in its entirety.) In addition to the arrangements described above, the upper and lower gaskets can be configured (i.e., sized, shaped and positioned) so that that the radially-outward pleat tips of the air filter do not extend radially outward beyond the radially-outward edges of the gaskets.

Various arrangements may be employed to enhance the effects disclosed herein. Thus in some embodiments, a room air purifier may be configured so that mandrel 60 is in contact with the upper portion 20 of the room air purifier. In fact, in the exemplary embodiments described earlier herein and depicted e.g. in FIGS. 3, 6, 7 and 8, mandrel 60 is non-detachably attached to the upper portion 20 by way of being integral with waistpiece 24 of upper portion 20. Whatever the specific arrangement, mandrel 60 may be configured so that a force-transmissive pathway exists between the upper end 62 of mandrel 60 and the upper portion 20 of the room air purifier.

In contrast to the relationship between the upper end 62 of mandrel 60 and the upper portion 20 of the room air purifier, in some embodiments no part of mandrel 60 will contact any part, item or component of the lower portion 50 of the room air purifier in a way that provides a force-transmissive pathway from the mandrel into the lower portion of the room air purifier. In particular embodiments, no portion of mandrel 60 will contact any part of lower portion 50, including in particular floor panel 52. Whatever the specific arrangement, in such embodiments there will be no force-transmissive pathway by which a force can be (directly) transmitted from the mandrel into the lower portion of the room air purifier. This will provide that, even though upper end 62 of mandrel 60 may be in force-transmissive contact with the upper portion 20 of the room air purifier, there exists no force-transmissive pathway from upper portion 20 to lower portion 50, that passes through mandrel 60.

This can provide that when an air filter 100 is seated on mandrel 60 and the floor panel 52 is joined to the lower housing piece 51 in the manner described earlier herein, the desired compressive force on the pleated air filter will be achieved without some or all of the compressive force being borne by the mandrel. Such an arrangement can provide that in the assembled room air purifier as sitting upright in normal operation, a significant portion of the weight of upper portion 20 of the room air purifier can be supported by a force-transmission pathway that passes through the sidewalls of upper housing piece 21 and into and through the sidewalls of lower housing piece 51. As discussed extensively herein, a portion (e.g. a significant portion) of this weight may be borne by a force-transmission pathway that passes through the pleated air filter 100; this may contribute to the achieving, and/or maintaining, of the compressive force on the pleated air filter as desired herein. In various embodiments, the proportion of the weight of the upper portion of the room air purifier that is borne by the pleated air filter versus that borne by the sidewalls of the housing pieces, may vary depending on the specific design. However, any such arrangement will be contrasted to conventional approaches in which a mandrel upon which an air filter is disposed, bears a significant amount of the weight of the upper portion of the room air purifier. Indeed, in some conventional arrangements in the art, a lower portion of a room air purifier lacks any lower housing piece resembling the herein-described lower housing piece 51, with the result that essentially the entire weight of the upper portion of the room air purifier is borne by the mandrel (and with the air filter bearing none of the weight).

An arrangement as described herein, in which a mandrel 60 has no force-transmissive contact with the lower portion 50 of the room air purifier (except indirectly via the sidewalls of the upper and lower housing portions and via the pleated air filter itself) will be referred to as comprising a "floating" mandrel. An exemplary arrangement of this type is shown in FIG. 7, which is a cross-sectional view of a mandrel (an air filter 100 is omitted from this and several other figures herein, so that other details may be more easily seen) in relation to the upper and lower portions of the room air purifier. The upper end 62 of mandrel 60 is in force-transmissive contact with the upper portion 20 of the room air purifier by way of being integral with the waistpiece 24 of the upper portion 20. In contrast, lower end 61 of mandrel 60 is not in contact with floor panel 52 of lower portion 50. Rather, lower end 61 is spaced above the upward-facing surface 54 of floor panel 52 to provide a gap 69 therebetween, as denoted in FIG. 7. This gap need only be in the range of a few mm (e g at least 1, 2, 3, or 4 mm), as long as it is sufficient to avoid contact, so as to provide an interruption in what might otherwise provide a direct, force-transmissive pathway. In further embodiments, this gap may be at most 20, 15, 10, or 5 mm. In general, gaps may be present between all parts of the mandrel and all parts of the lower portion of the room air purifier, so that the mandrel is a floating mandrel that does not support any of the weight of the upper portion of the room air purifier. Configuring lower gasket 84 in the general form of an annular ring in the manner discussed earlier herein may also facilitate such arrangements.

Air filters 100 that may be used in room air purifier 1 have already been described in general. Such an air filter will be cylindrical, pleated, unframed, compactable, and so on. In some embodiments, such an air filter 100 may consist of, or consist essentially of, the air filter media 110 itself. In this context, the terminology "consist essentially of" permits the presence of certain ancillary components or materials. These can include an adhesive or mechanical fastener as may be needed to take an elongate piece of filter media and join the ends together to form the elongate piece into a cylinder, can include one or more removal and/or identification tabs, and/or can include one or more dams of hardened adhesive on the radially inward side of the pleated filter. This terminology also does not exclude embodiments in which the air filter media is a multilayer media as disclosed herein, including an additional layer of filter media that is concentrically disposed within the pleated filter media. This terminology also allows, in some embodiments, the corrugated edges 101 and 102 of the filter media to be equipped with a thin layer of a flexible material applied e.g. edgewise to the corrugated edges. Such a material may be e.g. an elastomeric film or a nonwoven sheet or scrim. Such an arrangement may e g enhance the ability of the corrugated edges of the filter media to seal against the aforementioned upper and lower gaskets (or, at the very least, will not interfere with this ability). Nevertheless, such an arrangement (and all other arrangements mentioned in this paragraph) will not be considered to provide a framed or endcapped filter or a cartridge filter.

As noted above, an air filter 100 will comprise a pleated filter media 110 (whether single layer or multilayer) as shown in FIG. 3. The pleat direction (PD) of the pleated media will be at least generally aligned with the longitudinal/vertical axis 6 of the room air purifier. In particular, the air filter 100 will be installed in the room air purifier 1 so that the previously-discussed compressive force that is applied to the corrugated edges of the pleated filter media, will be aligned with the pleat direction of the pleated media. It will be appreciated that having the pleat direction aligned with the compressive force in this manner will allow the pleated media to exhibit substantial stiffness and resistance to buckling under the compressive force. (This can be contrasted with the previously-discussed ability of the pleated media to be "compacted" in a radially inward direction.) Using a fairly tight pleat spacing (e.g. a nominal pleat spacing of e.g. 3.0-5.0 mm as discussed below) can further enhance this ability.

In some embodiments it may be helpful for the filter media to exhibit sufficient "inherent" stiffness (this may be measured e.g. on unpleated filter media, or on a single panel of the pleated material, between score lines, so as to not be affected by any folds or scores that have been imparted to the material). In various embodiments, the filter media may exhibit a Gurley Stiffness of at least 200, 300, 400, 600, 800, or 1000 mg (which is the customary unit for Gurley Stiffness). The Gurley Stiffness will be measured according to the procedures described in U.S. Provisional Patent Application 62/986,300 and in the resulting International (PCT) Application No. IB2021/051400, the relevant sections of both of which are incorporated by reference herein.

The pleated air filter media 110 may be pleated so as to exhibit any suitable pleating geometry. Such a pleating geometry may be characterized in terms of various parameters, e.g. the pleat spacing (i.e. the tip-to-tip distance, along the length axis, between same-side pleats) and the pleat height (i.e. the distance between successive inward and outward pleat tips, along a direction normal to the major plane of the pleated media). All such characterizations will be performed with the pleated media put into a nominally planar configuration. Pleating parameters such as pleat spacing, pleat height, etc., are discussed in detail in U.S. Patent Application Publication 2018/0021716 (with particular reference to FIG. 5 and paragraphs 0046-0048 of that document), which is incorporated by reference in its entirety herein.

In various embodiments, the pleated air filter media, when in a nominally planar configuration, may exhibit an average pleat spacing of at least 2.0, 2.5, 3.0, or 3.2 mm; in further embodiments, the average pleat spacing may be at most 6.0, 5.5, 5.0, 4.5, 4.0, or 3.8 mm. When formed into a generally cylindrical configuration of the type shown in FIG. 6, the pleat spacing of the radially-outward pleat tips 107 may expand somewhat compared to their spacing when in the nominally planar condition, while the pleat spacing of the radially-inward pleat tips 106 may remain near their nominal value or may decrease slightly. For example, a pleated media with a nominal pleat spacing of 3.5 mm (and with a pleat height of approximately 20 mm), when formed into a cylindrical pleated air filter of the type shown in FIG. 6 with an overall outer diameter of approximately 160 mm, may exhibit a radially-outward pleat tip spacing of approximately 4.5 mm with the radially-inward pleat tip spacing remaining at approximately 3.5 mm. In various embodiments, the (nominal) pleat height may be at least 12, 15, 18, 21, or 24 mm; in further embodiments, the nominal pleat height may be at most 35, 32, 29, 26, 23, or 20 mm.

The pleated filter media 110 can exhibit any suitable thickness. By thickness is meant the local thickness of the filter media material itself, rather than an overall "thickness" of the pleated media (such an overall thickness will often correspond to the pleat height as described above). In various embodiments, the (local) thickness of the pleated filter media may be less than or equal to 3.0, 2.5, 2.0, 1.5, or 1.0 mm. In further embodiments, this thickness may be greater than or equal to 0.1, 0.2, 0.5, or 0.8 mm.

In some embodiments, pleated media 110 may bear one or more elongate dams of hardened adhesive (sometimes referred to as "glue beads") that exhibit a long axis that is at least generally aligned with the above-described length direction of the pleated filter media 110. (That is, the dams will be oriented perpendicular to the pleat direction PD and will extend across multiple pleat tips and valleys.) If multiple dams are present, they may be spaced apart from each other along the above-described width direction (pleat direction) of the pleated filter media. Each such dam may be formed e.g. by depositing an elongate bead of molten adhesive onto the filter media. In some embodiments, the media may be scored and/or temporarily folded into a pleated configuration (so that it will be easier to re-fold the media into the permanent pleated configuration at a later time), then unfolded into a planar or nominally-planar configuration, after which the bead of adhesive is applied. The media can then be refolded along the score lines, with the result that the bead of adhesive is trapped in the pleat valleys and is allowed to harden to form the dam.

In some embodiments, multiple (e.g. two or more) beads of adhesive may be applied simultaneously, e.g. at locations spaced across the width of the filter media. In some embodiments, each such bead may be continuous (so that the thus-formed dam is continuous); in other embodiments, the adhesive application may be intermittent. For example, in some embodiments, the adhesive application may be omitted for panels of the filter media that are to become end panels that are to be joined together e.g. by ultrasonic welding to form the filter media into a cylinder. (The adhesive will typically be applied and hardened before the length of filter media is formed into a cylinder.) In some embodiments the adhesive application may be discontinuous to the point that the hardened adhesive material of the thus-formed dam does not extend fully into all, some, or any, of the pleat valleys. Methods and arrangements for applying beads of hardenable adhesive in the general manner described above, so as to produce adhesive dams, are described in detail in U.S. Patent Application Publication 2006/0005518 (with particular reference to FIGS. 1*a*, 1*b* and 3 thereof), which is incorporated by reference in its entirety herein.

Such dams may serve to stabilize the pleat spacing of the pleated filter media and/or to enhance the overall mechanical integrity of the pleated air filter. By definition, any such adhesive dam will not be equated with any of the rigid support frames, endcaps, and so on, that are described elsewhere herein and that cylindrical filters are conventionally fitted with (e.g. to form filter cartridges). In some embodiments, one, two, three or more adhesive dams may be present on the radially-inward side 104 of the cylindrical air filter, with no adhesive dams being present on the radially-outward side 105 of the cylindrical air filter. The providing of adhesive dams only on the radially inward side can provide the desired stabilization while still allowing the pleated media to be easily formed into a cylindrical shape. It may be particularly advantageous for all such adhesive dams to be on the radially-inward side of the pleated media so that the adhesive dams do not interfere with previously-discussed ability of the radially-outward pleat tips to expand to a large pleat spacing at the extreme end portions of the air filter (commensurate with the tight radius of curvature at those locations) when the air filter is in a compacted configuration. It has also been found that the use of adhesive dams made of materials that, when hardened, exhibit at least some flexibility (as opposed to materials that are e.g. stiff or brittle) can enhance the ability of the pleated media to assume a compacted shape without damaging or dislodging the adhesive dams and without damaging or permanently mis-shaping the pleated air filter media.

When fully installed onto mandrel 60, air filter 100 will be positioned radially-outwardly of the radially-outward surface 66 of the mandrel. In some embodiments, at least some portions of at least some radially-inward pleat tips 106 of the air filter may be in contact with radially-outward surface 66 of the mandrel. In locations bearing an adhesive dam (and if the adhesive dam protrudes locally radially inwardly of a pleat tip), the adhesive dam may be in contact with surface 66 of the mandrel. The radially-outwardmost surfaces of the pleated air filter will typically be provided by radially-outward pleat tips 107, as indicated in FIG. 6.

In some embodiments, air filter 100 may comprise at least one tab. In some embodiments such a tab may be removal tab that can be grasped in order to slidably remove the air filter from mandrel 60. Thus in some embodiments a user may simply grasp the one or more removal tabs and pull upward to slidably move the air filter off of mandrel 60. In some embodiments, any such removal tab may be located at a location other than the extreme upper and lower ends of the air filter (e.g. so that the tab does not interfere with the abutting of the corrugated edges of the pleated filter media against the resilient gaskets). In some embodiments a tab may be an identification tab, e.g. that includes filter information (product number, re-ordering information, any relevant regulatory information, and so on). In some embodiments a tab may serve as both a removal tab and as an identification tab.

Any such tab may be non-removably attached to the pleated filter media, e.g. by way of being ultrasonically bonded to a panel of the pleated filter media. In some embodiments, such a tab may protrude radially outward from the pleated filter media and may be rather stiff; this can provide that the airflow does not urge the tab flush against the filter media in a way that might locally occlude an area of the filter media. In some embodiments, the tab (e.g. even if rather stiff) may be made of a highly air-transmissive material (e.g. a netting or a highly porous nonwoven) so that even if the tab does become situated flush against the filter media, the effect on the filtration may be minimal.

Filter media 110 may be comprised of nearly any material, in any configuration, that is capable of filtering moving air. Such media may include, but is not limited to, fibrous materials (e.g., nonwoven webs, fiberglass webs, and so on), porous membranes, and so on. In particular embodiments, the filter media may include at least one layer that comprises at least some material that can be electrically charged to form an electret material. In particular embodiments, the filter media may be a multilayer media that comprises at least one layer that includes an electret material, and at least one layer that includes a sorbent material. In some embodiments filter media 110 may comprise at least one layer capable of HEPA filtration. In particular embodiments filter media 110 may comprise a prefilter layer e.g. in combination with an electret layer that is capable of HEPA filtration. In some embodiments a multilayer filter media may comprise a layer that serves primarily to enhance the stiffness and pleatability of the multilayer media; such a layer may not necessarily play a significant role in performing filtration.

If at least one layer of the filter media 110 is to be charged, this may be done by any suitable method, for example, by imparting electric charge to the nonwoven web using water as taught in U.S. Pat. No. 5,496,507. Nonwoven electret webs may also be produced by corona charging as described in U.S. Pat. No. 4,588,537, or using mechanical approaches to impart an electric charge to fibers as described in U.S. Pat. No. 4,798,850. Any combination of such approaches may be used. In various embodiments, filter media 110 may exhibit a Percent Penetration (of airborne particles, testing using Dioctyl Phthalate as a challenge material, and tested according to the general methods described in U.S. Pat. No. 7,947,142) of less than about 20, 10, 5, 1, 0.1, or 0.03. In many embodiments, the filter media will comprise at least one layer that is configured to capture particles (e.g. by way of including electrets as discussed above).

In at least some embodiments, air filter 100 and filter media 110 thereof will be disposable. The term disposable is used in general to denote that the air filter is removed after use (e.g. when the filter is judged to be nearing the end of its usable lifetime) rather than remaining permanently in the room air purifier or being removed, cleaned and reinstalled in the room air purifier. As such, the term disposable encompasses air filters that are recyclable, compostable, and so on.

If at least one layer of the filter media 110 is to exhibit sorbent functionality, any suitable sorbent(s), in any convenient physical form, may be included in such a layer. In some embodiments, the sorbent includes at least some activated carbon, e.g. that is treated to enhance its ability to capture odors in general, and/or to capture formaldehyde in particular. Suitable treatments may e.g. provide the activated carbon with at least some amine functionality and/or at least some manganate functionality and/or at least some iodide functionality. Specific examples of treated activated carbons that may be suitable include those that have been treated with e.g. potassium permanganate, urea, urea/phosphoric acid, and/or potassium iodide. Other sorbents that may be potentially suitable e.g. for removing formaldehyde include e.g. treated zeolites and treated activated alumina. Such materials may be included e.g. along with treated activated carbon if desired. In particular embodiments, the sorbent may include materials described in U.S. patent Ser. No. 10/780,416, which is incorporated by reference in its entirety herein.

The one or more sorbents may be provided in any usable form; for example as particles, which may be e.g. powder, beads, flakes, whiskers, granules or agglomerates. The sorbent particle size may vary as desired. The sorbent particles may be incorporated into or onto a layer of filter media 110 in any desired fashion. For example, in various embodiments the sorbent particles may be physically entangled with fibers of a layer of filter media 110, may be adhesively bonded to such fibers, or some combination of both mechanisms may be used.

In some embodiments a sorbent-loaded layer may be a layer that is pleated along with a particle-filtration media 110. For example, a sorbent-loaded layer may be joined to a particle-filtration layer with the resulting multilayer filter media then being pleated. In other embodiments, an unpleated sorbent-loaded layer may be provided (e.g. as a hollow cylinder) and may be disposed radially inwardly of pleated filter media 110, e.g. with the sorbent-loaded layer being bonded at least to some of the radially-inward pleat tips 106. In such an arrangement, the radially-inward surface of the sorbent-loaded layer will define the radially-inward side 104 of the air filter, will define air space 103 within the air filter, and will be the surface of the air filter that is in contact with the radially-outward surface 66 of mandrel 60. (In such a case, the unpleated sorbent-loaded layer will be disregarded in computing the various pleating parameters discussed earlier herein.) In some embodiments, such an unpleated sorbent-loaded layer may comprise an upper edge that is recessed slightly upward (generally along the vertical axis of the air filter and the room air purifier) from the upper corrugated edge 101 of the pleated filter media 110; and/or, the unpleated sorbent-loaded layer may comprise a lower edge that is recessed slightly downward (again along the vertical axis) from the lower corrugated edge 102 of the pleated filter media 110. This can ensure that the presence of the sorbent-loaded layer does not interfere with the ability of the corrugated edges of the pleated filter media to seal against the upper and lower resilient gaskets as disclosed herein.

In some embodiments, a room air purifier as disclosed herein may be configured to enable touchless removal of an air filter. This may be facilitated e.g. by choosing the inner diameter of the air filter 100 so that the air filter, while able to fit on the mandrel 60, does not fit tightly on the mandrel. This may enable a removal method that may be as simple as e.g. lifting the room air purifier up from the surface on which it sits during normal operation, detaching the floor panel 52, and allowing the air filter to slide off the mandrel under the influence of gravity, e.g. with the room air purifier held over a waste receptacle or recycling container.

In other embodiments as noted earlier herein, the room air purifier can be inverted and the floor panel 52 detached, after which the air filter can be removed, by grasping the air filter itself and/or by grasping one or more removal tabs provided for that purpose. The mandrel 60 may be provided with one or more notches 71 that enable the user to easily reach in to grasp the air filter and/or a removal tab attached thereto, as noted earlier. Also as noted, the ease of inverting a room air purifier for purposes of removing/replacing an air filter can be enhanced by providing that the topside of upper portion 20 of the room air purifier comprises a substantially planar surface (provided e.g. by uppermost sections of a grill 28) so that the room air purifier can be temporarily stably parked on a horizontal surface (e.g. a countertop). In some embodiments the room air purifier may be equipped with a handle (not shown in any Figure) e.g. that is hingedly connectable to the sidewalls of upper housing piece 21. Such a handle can be configured so that when not in use, it can be positioned so that it does not obstruct the outflow of air from air outlet 25 and does not interfere with the parking of the inverted room air purifier on its topside (which will of course temporarily be the bottom of the inverted room air purifier).

Discussions herein have noted that an air purifier and a pleated air filter can be configured so that bringing a floor panel 52 of the room air purifier into place against a lower housing piece 51 of the room air purifier and attaching the floor panel to the lower housing piece, can cause a compressive force to be applied to the pleated air filter so that upper and lower corrugated edges of the pleated air filter are pressed against upper and lower resilient gaskets of the room air purifier in a way that substantially minimizes air leaks around the corrugated edges. The floor panel can then be held in place e.g. by one or more latches that secure the floor panel in place, so as to cause the desired compression to be maintained indefinitely.

Such arrangements (in which the compressive force will typically be aligned with the vertical axis of the room air purifier, the mandrel, and the air filter) can be achieved in any suitable way. For example, the geometric placement and dimensions of the various components can be configured so that a user will have to push the floor panel against the lower housing portion with a particular force in order that one or more latches can be closed to secure the floor panel to the lower housing portion. The placement and dimensions of the various components may be configured so that the force that is needed in order to bring the latch(es) into a position in which they can be closed, is commensurate with achieving the desired local compression of the resilient gaskets by the corrugated edges of the pleated air filter.

In some such arrangements, the latch or latches may merely serve to hold the floor panel in place once the proper positioning, and resulting compressive force, has been established. That is, while the latch(es) may place a role in maintaining a compressive force after it has been achieved, the latch(es) may play little or no part in initially achieving the desired placement and compressive force. In other embodiments, one or more latches may serve at least in part to achieve the desired positioning and resulting compressive force. Thus for example, in some embodiments a latch of the type commonly referred to as a latch clamp, draw latch, compression latch or tension latch may be used. With such a latch or latches, a user may bring the floor panel against the lower housing portion but without necessarily applying a firm force. The user may then position the latch (or latches) and then close the latch(es), with the act of closing the latch(es) serving to draw the floor panel against the lower housing portion (e.g. through a last few mm of movement) to a position that imparts the desired compressive force. (Latches of a general type that may be suitable for such purposes are disclosed e.g. in U.S. Pat. Nos. 6,457,750 and 8,186,728 and in U.S. Patent Application Publication 2020/0087958.)

In some embodiments a latch (in particular, a draw latch) may be a force-limiting latch, e.g. a torque-limiting latch. Such a latch may be configured so that once a specified force threshold is exceed, a higher force will not be applied. Such a latch may, for example, have a manipulable handle that, once a certain resistance to rotation is encountered, will slip and freely rotate without causing any further movement of the latch. In some embodiments a latch may be used that has to be manually manipulated to close the latch and to open the latch. In some embodiments a latch may be auto-locking, so that the act of pushing the panel against the lower housing portion causes the latch to automatically close. Such a latch may then need to be manipulated to be opened. In many embodiments, an auto-locking latch may provide the first type of latching described above, in which the latch merely secures the floor panel to the lower housing portion rather than playing a significant part in the achieving of the desired positioning and compressive force.

In some embodiments, a room air purifier may comprise a design in which one or more hinged connections are present between the floor panel and the lower housing piece; in such a design, the floor panel may not necessarily come completely apart from the lower housing portion but rather may open in a "clamshell" fashion. In such a design, the floor panel is rotatably movable about an axis of rotation established by the one or more hinges, so that the floor panel, even though remaining connected to the lower housing piece, is movable to a position sufficiently out of the way to allow a spent air filter to be removed and/or a new air filter to be installed. (In such a design, one or more latches may be present on sides of the lower housing piece and/or sides of the floor panel that are e.g. generally opposite from sides that bear one or more hinges.) It will thus be understood that the terminology of a floor panel 52 that is "detachably attached" to a lower housing portion, and to a room air purifier in general, encompasses arrangements in which the floor panel is not necessarily completely separable from the lower housing piece, but rather in which the floor panel is openable, e.g. clamshell style, to a sufficient extent to allow the operations disclosed herein. Any suitable arrangement of one or more latches (with or without one or more hinges) may be used for the purpose of securing the floor panel to the lower housing portion and achieving the desired compression force on the air filter.

By way of a specific example, the floor panel 52 and lower housing piece 51 as shown e.g. in FIG. 2, comprise a hinge-and-latch arrangement. Floor panel 52 comprises two outward-facing, generally U-shaped hinge elements 58 that fit together with complementary hinge elements (not visible) of a lower edge of lower housing piece 51, to form hinges. Floor panel 52 further comprises a deflectable latch structure 59 that acts in combination with a complementary latch structure (not visible) of a lower edge of lower housing piece 51 to form a latch. The hinge elements are on a first side of the lower housing portion and floor panel and the latch structures are on a second, opposing side. One or both latch structures can be manually deflected (e.g. by the fingers of a person) to unlatch the structures from each other, at which point the second side of the floor panel can be rotated away from the lower housing portion about an axis of rotation defined by the hinge elements. In the depicted embodiment, the hinge elements 58 of the floor panel are not permanently attached to the complementary hinge elements of the first side of the lower housing portion. Therefore, once the floor panel is rotated sufficiently far out of its installed position, the floor panel is free to be completely removed from the lower housing portion.

To reinstall the floor panel, the floor panel can be held at an angle so that hinge elements 58 interface with the complementary hinge elements of the lower housing portion. Once this is achieved, the floor panel can be rotatably moved about the axis of rotation collectively defined by the hinge elements. This can be continued until the latch structures approach each other. In the depicted embodiment, the impingement of the latch structures on each other will cause one or both of them to deflect and then to snap back into their latched position (thus providing an auto-latching arrangement). As discussed elsewhere herein, the hinges, latches, and so on, can be configured so that the floor panel is held in a position that provides that the desired compression of the air filter is achieved. Variations of such approaches (e.g. the type, number, and/or placement of latches and hinges, which latch elements may be deflectable, and so on) can be envisioned. In some embodiments a floor panel may be latched or otherwise connected to a mandrel 60, either instead of, or in addition to, being latched to a lower housing piece. In some embodiments, a floor panel may be threadably attachable to a lower portion of a housing.

The above discussions indicate that at least some of a compressive force that promotes the herein-described minimizing of leaks at corrugated edges of a pleated air filter, can be a squeezing force that is maintained by one or more latches that hold the floor panel to the lower housing portion of the room air purifier more tightly than might otherwise need be the case. The design of the herein-disclosed room air purifier may contribute to this compressive force somewhat, by leveraging the weight of the upper portion of the room air purifier. Thus in the disclosed arrangement, the upper portion 20 of the room air purifier may comprise a fan 120, an electric motor to drive the fan, various controls, and other ancillary components. In such an arrangement, the vast majority of the weight of the room air purifier may be in the upper portion 20. This weight may further contribute to the achieving of the desired compressive force.

In some embodiments, the overall shape of housing 9 of air purifier 1 as established e.g. by the combined upper and lower housing pieces 21 and 51, may exhibit any desired shape when looking along the longitudinal/vertical axis of the housing. For example, an air purifier may exhibit a circular shape, a quasi-circular shape, a square shape with rounded corners, and so on.

With particular regard to mandrel 60, the exemplary arrangements disclosed e.g. in the Figures herein have focused on the use of a mandrel that is "cylindrical" (i.e. is circular when viewed along the vertical axis of the mandrel). However, this is not strictly necessary. Thus in some embodiments, a mandrel could be somewhat oval, could be a modified polygon (e.g. generally square-shaped but with four rounded corners rather than sharp, 90 degree corners), and so on. In some embodiments, the mandrel may exhibit a shape that is intermediate between a square and a circle, e.g. a so-called squircle, a superellipse, a rounded square, a truncated circle, and so on. Any such shape is possible; all that is necessary is that the pleated air filter 100 is able to be disposed radially outward of the mandrel in such manner that the pleated air filter can be supported by the mandrel and so that the desired arrangement of the corrugated edges relative to the resilient gaskets can be achieved. Given this, it is stipulated that any designation of "cylindrical" as applied e.g. to a mandrel, pleated air filter, housing of a room air purifier, and so on, will be understood to mean "generally cylindrical", which terminology specifically encompasses shapes (e.g. as described above) that are not strictly circular when viewed along the vertical axis of the item. Similarly, the use of terms such as annular, radial, circumferential, diameter, diametrical, and the like, will not imply the need for a strictly circular overall shape, edge shape, and so on.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. Thus, the scope of the present invention should not be limited to the specific illustrative structures described herein, but rather extends at least to the structures described by the language of the claims, and the equivalents of those structures. Any of the elements that are positively recited in this specification as alternatives may be explicitly included in the claims or excluded from the claims, in any combination as desired. Any of the elements or combinations of elements that are recited in this specification in open-ended language (e.g., comprise and derivatives thereof), are considered to additionally be recited in closed-ended language (e.g., consist and derivatives thereof) and in partially closed-ended language (e.g., consist essentially, and derivatives thereof). To the extent that there is any conflict or discrepancy between this specification as written and the disclosure in any document that is incorporated by reference herein, this specification as written will control.

What is claimed is:

1. A room air purifier comprising:

an upper portion comprising an upper housing piece and a powered fan, a lower portion comprising a lower housing piece;

an air-transmissive mandrel that is non-detachably attached to the upper portion of the room air purifier and is located in the lower portion of the room air purifier and that is configured to receive and support a disposable, generally cylindrical, unframed, compactable, pleated air filter, the upper and lower portions of the room air purifier being non-detachably attached to each other and defining an airflow path through the room air purifier so that unfiltered air can enter through an air inlet of the lower housing piece and filtered air can exit through an air outlet of the upper housing piece, as motivated by the powered fan;

a lowermost floor panel that is detachably attached to a lower end of the lower housing piece of the lower portion of the room air purifier, and, a disposable, generally cylindrical, unframed, compactable, pleated air filter removably installed in the room air purifier by way of being disposed radially-outwardly on the mandrel with a pleat direction of the air filter aligned with a vertical axis of the room air purifier, wherein the upper portion of the room air purifier comprises an integrated resilient upper gasket in the form of an upper annular ring with a major lower surface that is configured to accept an upper corrugated edge of the air filter thereagainst; and, wherein the floor panel of the room air purifier comprises an integrated resilient lower gasket with a major upper surface that is configured to accept a lower corrugated edge of the air filter thereagainst, and wherein with the air filter installed in the room air purifier and with the floor panel attached to the lower end of the lower housing piece of the lower portion of the room air purifier, the upper portion of the room air purifier and the floor panel of the room air purifier apply pressure to the air filter through the upper and lower gaskets so that areas of the upper and lower gaskets that are in contact with the upper and lower corrugated edges of the pleated air filter are locally compressed by a compression factor of at least 10%.

2. The room air purifier of claim 1 wherein with the air filter installed in the room air purifier and with the lowermost floor panel attached to the lower end of the lower housing piece of the lower portion of the room air purifier, the upper portion of the room air purifier and the lowermost floor panel of the room air purifier apply pressure to the air filter through the upper and lower gaskets so that the areas of the upper and lower gaskets that are in contact with the upper and lower corrugated edges of the air filter are locally compressed by a compression factor of from 30% to 70%.

3. The room air purifier of claim 1 wherein at least the integrated resilient upper gasket exhibits a modified Compression Force Deflection value, at 50% compression, of 0.8 psi or less, and is from 2 to 10 mm thick.

4. The room air purifier of claim 1 wherein the integrated resilient upper gasket comprises a radially-inward edge that is located radially-inwardly of all radially-inward pleat tips of the pleated air filter, and wherein the integrated resilient lower gasket comprises a radially-inward edge that is located radially-inwardly of all radially-inward pleat tips of the pleated air filter.

5. The room air purifier of claim 1 wherein the upper and lower gaskets are each made of a polymeric foam that exhibits a density less than 0.2 grams per cc.

6. The room air purifier of claim 1 wherein the upper gasket is disposed on a downward-facing gasket-seating surface of a waistpiece of the upper portion of the room air purifier; and, wherein the lower gasket is disposed on an upward-facing gasket-seating surface of the lowermost floor panel of the room air purifier.

7. The room air purifier of claim 1 wherein the air filter exhibits a nominal pleat spacing of from 2.5 to 6 mm and a pleat height of from 15 to 25 mm.

8. The room air purifier of claim 1 wherein the air filter is compactable so as to exhibit a volumetric compaction ratio of less than or equal to 30%.

9. The room air purifier of claim 1 wherein the air filter comprises at least two elongate dams of hardened adhesive that extend along a longitudinal direction of the air filter and are spaced apart from each other along the pleat direction of the air filter, each dam being on a radially inward side of the air filter with no adhesive dam being on a radially outward side of the air filter.

10. The room air purifier of claim 1 wherein the air filter comprises at least one removal and/or identification tab that is non-removably attached to a radially outward surface of the air filter.

11. The room air purifier of claim 1 wherein the mandrel is non-detachably attached to the upper portion of the room air purifier.

12. The room air purifier of claim 1 wherein with the air filter installed in the room air purifier and with the lowermost floor panel attached to the lower end of the lower housing piece of the lower portion of the room air purifier, no portion of the mandrel is in contact with any part of the lowermost floor panel of the room air purifier, so that the mandrel is a floating mandrel that does not support any of the weight of the upper portion of the room air purifier.

13. The room air purifier of claim 12 wherein with the air filter installed in the room air purifier and with the lowermost floor panel attached to the lower end of the lower portion of the room air purifier, all parts of a lower end of the mandrel are vertically spaced above an upward-facing major surface of the lowermost floor panel of the room air purifier, so that an air gap is present between the lower end of the mandrel and the upward-facing major surface of the lowermost floor panel of the room air purifier.

14. The room air purifier of claim 1 wherein the mandrel comprises a generally cylindrical air-transmissive first, upper portion that occupies from 70 to 95% of a total vertical height of the mandrel, and a frusto-conical air-transmissive second, lower portion that is an integral extension of the first portion and is tapered at a taper angle of from 6 to 20 degrees so that a diameter of a lower end of the second portion of the mandrel is between 88 and 98% of a diameter of the first portion of the mandrel.

15. The room air purifier of claim 1 wherein the mandrel comprises an upper terminus with a radially-outwardmost surface that is radially-inwardly-recessed a distance of at least 1.0 mm relative to an area of a radially outward major surface of the mandrel that is adjacent the upper terminus, the inwardly-recessed surface extending around an entirety of a circumferential extent of the upper terminus of the mandrel and occupying a vertical height of at least 3.0 mm.

16. A kit comprising the room air purifier of claim 1 with the air filter installed therein, along with at least one replacement air filter that is packaged in the kit outside of the room air purifier, the at least one replacement air filter being packaged in a compacted configuration in which the replacement air filter exhibits a volumetric compaction ratio of less than or equal to 30%.

\* \* \* \* \*